(12) United States Patent
Hoshi et al.

(10) Patent No.: US 8,072,937 B2
(45) Date of Patent: Dec. 6, 2011

(54) WIRELESS COMMUNICATION APPARATUS AND HANDOVER METHOD

(75) Inventors: Yoshiyuki Hoshi, Ishikawa (JP);
Mitsuru Satou, Ishikawa (JP);
Tomohiro Matano, Ishikawa (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 12/066,779

(22) PCT Filed: Mar. 3, 2006

(86) PCT No.: PCT/JP2006/304171
§ 371 (c)(1),
(2), (4) Date: Mar. 13, 2008

(87) PCT Pub. No.: WO2007/032106
PCT Pub. Date: Mar. 22, 2007

(65) Prior Publication Data
US 2009/0046654 A1    Feb. 19, 2009

(30) Foreign Application Priority Data

Sep. 16, 2005   (JP) .................. 2005-270443

(51) Int. Cl.
*H04W 4/00* (2009.01)
(52) U.S. Cl. ................ 370/331; 370/338; 370/341
(58) Field of Classification Search .............. None
See application file for complete search history.

(56) References Cited

U.S. PATENT DOCUMENTS

| | | | |
|---|---|---|---|
| 7,805,140 B2* | 9/2010 | Friday et al. ............. | 455/436 |
| 2003/0119529 A1 | 6/2003 | Hirokawa | |
| 2004/0259546 A1 | 12/2004 | Balachandran et al. | |
| 2006/0146781 A1* | 7/2006 | Adrangi et al. ............ | 370/349 |
| 2007/0022476 A1* | 1/2007 | Bae et al. .................. | 726/15 |

(Continued)

FOREIGN PATENT DOCUMENTS

GB         2321162 A       7/1998

(Continued)

OTHER PUBLICATIONS

A. Salkintzis, et al., "WLAN-GPRS Integration for Next-Generation Mobile Data Networks," IEEE Wireless Communications, vol. 9, No. 5, Oct. 2002, pp. 112-124, p. 3, line 1.

(Continued)

*Primary Examiner* — Chi Pham
*Assistant Examiner* — Soon-Dong Hyun
(74) *Attorney, Agent, or Firm* — Seed IP Law Group PLLC

(57) ABSTRACT

A wireless communication apparatus capable of shortening the handover time and preventing the connection from being interrupted during telephone communication. In this apparatus, an HO part (109), when detecting an access point, outputs an handover control signal for performing a handover that is a process of switching from a communication using a third generation mobile communication system to a communication using a WLAN. A positional information acquiring part (112) receives a GPS signal transmitted from a GPS satellite and generates GPS information indicative of the position of the local apparatus. When the GPS information shows that the local apparatus approaches the area of the WLAN by a predetermined distance, a period deciding part (115) decides that the period be shorter than when the local apparatus is at the predetermined distance away from the area of the WLAN. When the local apparatus approaches the area of the WLAN by the predetermined distance, an AP detection period control part (116) controls the operation of access point detection to be performed in the period shorter than when the local apparatus is at the predetermined distance away from the area of the WLAN.

20 Claims, 18 Drawing Sheets

U.S. PATENT DOCUMENTS

| | | | |
|---|---|---|---|
| 2007/0094709 A1* | 4/2007 | Hsu | 726/2 |
| 2007/0264979 A1* | 11/2007 | Park et al. | 455/414.1 |
| 2008/0049694 A1* | 2/2008 | Kinoshita et al. | 370/338 |
| 2008/0165740 A1* | 7/2008 | Bachmann et al. | 370/332 |

FOREIGN PATENT DOCUMENTS

| | | |
|---|---|---|
| JP | 2003/0119529 | 6/2003 |
| JP | 2003-333638 | 11/2003 |
| JP | 2004-320473 | 11/2004 |
| JP | 2005-033312 | 2/2005 |

OTHER PUBLICATIONS

A. Salkintzis C. Fors and R. Pazhyannur, Motorola: "WLAN-GPRS Integration for Next-Generation Mobile Data Networks," IEEE Wireless Communications; IP Multimedia in Next-Generation Mobile Networks: Services, Protocols, and Technologies, Oct. 2002, pp. 112-114.

Supplementary European Search Report for corresponding EP Application No. 06715230.6, dated Jul. 18, 2011, 3 pages.

* cited by examiner

| RSSI THRESHOLD VALUE | PERIOD |
|---|---|
| RSSI (A) | T (A) |
| RSSI (B) | T (B) |
| RSSI (C) | T (C) |
| RSSI (D) | T (D) |

FIG.10

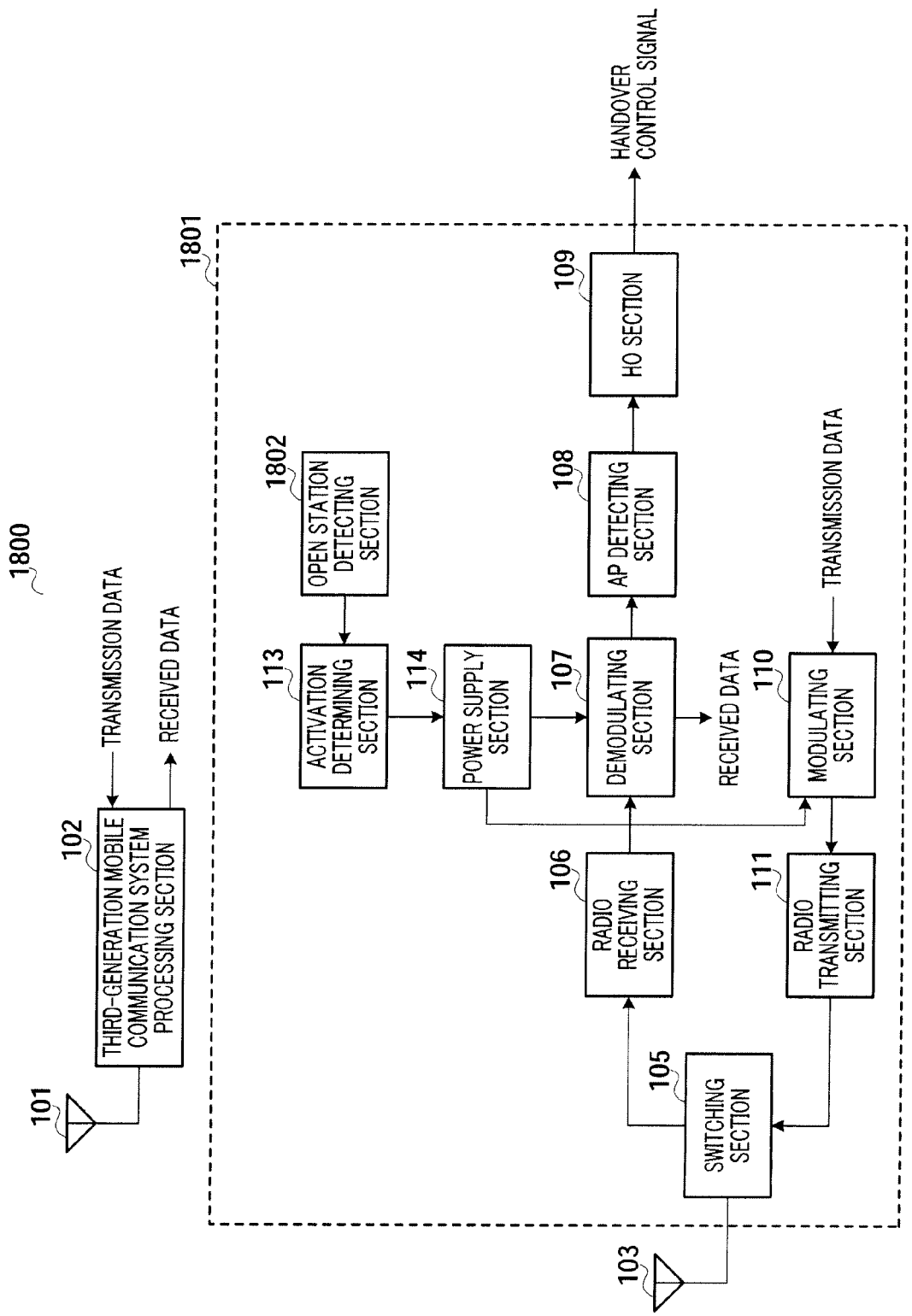

WIRELESS COMMUNICATION APPARATUS AND HANDOVER METHOD

TECHNICAL FIELD

The present invention relates to a wireless communication apparatus and a handover method. More particularly, the present invention relates to a wireless communication apparatus and a handover method for performing a handover from communication using the third-generation mobile communication system such as WCDMA (Wideband Code Division Multiple Access) to communication using a wireless local area network (hereinafter, referred to as "WLAN").

BACKGROUND ART

In recent years, as a transition technique to the fourth-generation mobile communication system, attention is focused on a 3G/WLAN inter-working technique that, by combining the current third-generation mobile communication system with WLAN, provides to users a wide range communication area of the third-generation mobile communication system and a wideband access of a WLAN system. In addition, a seamless handover technique is proposed which enables users to move between 3G and WLAN without taking into account the difference between wireless access schemes (for example, Non-Patent Document 1).

When a communication terminal apparatus receiving services in the third-generation mobile communication network moves to a WLAN area and thereby performs a handover to switch communication using the third-generation mobile communication system to communication using WLAN, the communication terminal apparatus detects an access point of WLAN prior to the handover. FIG. 1 shows a conventional access point detection period. In FIG. 1, the horizontal axis is time. As shown in FIG. 1, the communication terminal apparatus detects an access point at regular period T10 during communication using the third generation mobile communication system such as a call according to FOMA (registered trademark). The communication terminal apparatus detects an access point at time t2 by moving into the WLAN area at time t1. The communication terminal apparatus detects an access point, thereby performing a handover at time t3. Then, at t3 and after when the handover is finished, the communication terminal apparatus stops a call using the third-generation mobile communication system, and then, performs a call using WLAN. A time from time t1 at which the communication terminal apparatus has moved into the WLAN area to time t3 at which the handover is performed, is defined as a "handover time." Further, the communication terminal apparatus does not detect an access point during a call using WLAN at t3 and after.

Non-patent Document 1: "WLAN-GPRS integration for next-generation mobile data networks," Apostolis K. Salkantzis, Chad Fors and Rajesh Pazhyannur, IEEE Wireless Communications, vol. 9, no. 5 October 2002, pp. 112-124.

DISCLOSURE OF INVENTION

Problems to be Solved by the Invention

However, irrespective of a position of the communication terminal apparatus with respect to the WLAN area, a conventional apparatus detects an access point at the same period T10, and so there is a problem that access point detection is delayed. As a result, a timing of starting handover processing is delayed, and so there is a problem that a handover time is extended. In addition, a timing of starting handover processing is delayed, and so, when users move to an area where only WLAN can be used, such as a site of a subway station, during a call using the third-generation mobile communication system, there is a problem that connection is cut. In addition, when both communication using WLAN and communication using the third-generation mobile communication system are available, in the conventional apparatus, a handover to WLAN, for which call charge is cheaper than the third-generation mobile communication system, is delayed, and so there is a problem that a call charge becomes relatively expensive.

It is therefore an object of the present invention to provide a wireless communication apparatus and a handover method that can detect an access point of WLAN earlier and thereby can reduce a handover time, prevent communication from being cut during a call and switch earlier to WLAN for which call charge is cheaper, and, consequently, can save a call charge.

Means for Solving the Problem

A wireless communication apparatus according to the present invention employs a configuration including: a period control section that controls a period for detecting an access point of a wireless local area network; an access point detecting section that detects the access point at a period controlled by the period control section; and a switching section that, when the access point is detected during communication using a third-generation mobile communication system, switches communication using the third-generation mobile communication system to communication using the wireless local area network.

A handover method according to the present invention includes: controlling a period for detecting an access point of a wireless local area network; detecting the access point at the controlled period; and when the access point is detected during communication using a third-generation mobile communication system, switching communication using the third-generation mobile communication system to communication using the wireless local area network.

Advantageous Effect of the Invention

According to the present invention, an access point of WLAN can be detected earlier, so that it is possible to reduce a handover time, prevent connection from being cut during a call, and switch earlier to WLAN for which call charge is cheaper, and, consequently, save the call charge.

BRIEF DESCRIPTION OF DRAWINGS

FIG. 10 shows a relationship between an RSSI threshold value and a period according Embodiment 4 of the present invention;

FIG. 19 is a block diagram showing a configuration of a wireless communication apparatus according to Embodiment 11 of the present invention.

BEST MODE FOR CARRYING OUT THE INVENTION

Hereinafter, embodiments of the present invention will be described in detail with reference to the accompanying drawings.

Embodiment 1

Figure 2:
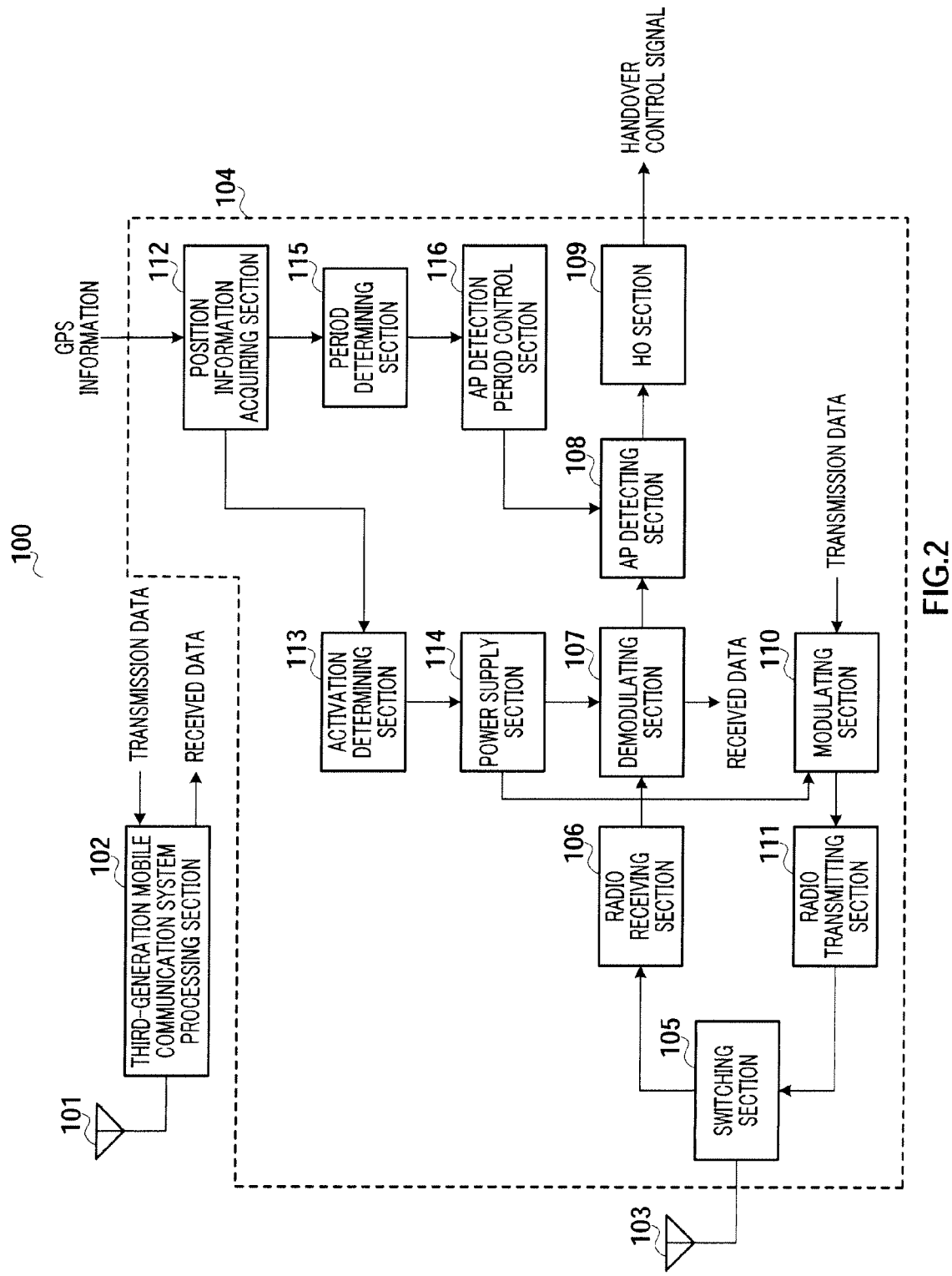
FIG. 2 is a block diagram showing a configuration of a wireless communication apparatus according to Embodiment 1 of the present invention.

FIG. 2 is a block diagram showing a configuration of wireless communication apparatus 100 according to Embodiment 1 of the present invention. Wireless communication apparatus 100 is a communication terminal apparatus such as a mobile telephone.

Wireless communication apparatus 100 includes: antenna 101 that transmits and receives a signal when communication is performed using the third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 104 that performs signal processing when communication is performed using WLAN. In addition, WLAN processing section 104 includes: switching section 105; radio receiving section 106; demodulating section 107; AP detecting section 108; HO section 109; modulating section 110; radio transmitting section 111; position information acquiring section 112; activation determining section 113; power supply section 114; period determining section 115; and AP detection period control section 116.

Switching section 105 outputs a received signal inputted from antenna 103 to radio receiving section 106 and outputs a transmission signal inputted from radio transmitting section 111 to antenna 103.

Radio receiving section 106 down-converts a received signal inputted from switching section 105 from a radio frequency to a baseband frequency, and then, outputs the down-converted signal to demodulating section 107.

When power is supplied from power supply section 114, demodulating section 107 demodulates the received signal inputted from radio receiving section 106, and then, outputs the demodulated signal to AP detecting section 108. In addition, demodulating section 107 demodulates the received signal inputted from radio receiving section 106 and outputs the signal as received data. Further, when power is not supplied from power supply section 114, demodulating section 107 outputs nothing to AP detecting section 108.

AP detecting section 108 attempts to detect an access point using the received signal inputted from demodulating section 107 at a period controlled by AP detection period control section 116, and then, when an access point is successfully detected, outputs information showing that the access point has been successfully detected, to HO section 109. Specifically, AP detecting section 108 detects an access point using two methods. According to the first method, when ID extracted from information of beacon, which is included in the received signal inputted from demodulating section 107 and reported from an access point, matches ID stored in advance, AP detecting section 108 decides that an access point has been successfully detected. According to the second method, when ID extracted from a probe response, which is a response from an access point that receives a probe request as a search signal which is included in the received signal inputted from demodulating section 107 and is transmitted by wireless communication apparatus 100, matches ID stored in advance, AP detecting section 108 decides that an access point has been successfully detected.

When AP detecting section 108 inputs information showing that an access point has been successfully detected, HO section 109, which is a switching section, outputs a handover control signal, and then, performs control so as to perform a handover to switch communication using the third-generation mobile communication system to communication using WLAN.

When power is supplied from power supply section 114, modulating section 110 modulates transmission data, generates a transmission signal, and then, outputs the generated transmission signal to radio transmitting section 111. Modulating section 110 outputs nothing to radio transmitting section 111 when power is not supplied from power supply section 114.

Radio transmitting section 111 up-converts the transmission signal inputted from modulating section 110 from a baseband frequency to a radio frequency, and then, outputs the up-converted signal to switching section 105.

Position information acquiring section 112 receives a GPS signal transmitted from a GPS satellite, and then, generates GPS information (position information) showing a position of the communication terminal apparatus. Then, position information acquiring section 112 outputs the generated GPS information to activation determining section 113 and period determining section 115.

Activation determining section 113 decides whether or not to activate a WLAN circuit, based on the GPS information inputted from position information acquiring section 112. Specifically, when the GPS information, inputted from position information acquiring section 112, comes close at a predetermined distance to a WLAN area, activation determining section 113 commands power supply section 114 to start supplying power. On the other hand, when the GPS information, inputted from position information acquiring section 112, is spaced apart by a predetermined distance from the WLAN area, activation determining section 113 commands power supply section 114 not to supply power.

Power supply section 114 starts or stops supplying power according to the command from the activation determining section 113, to demodulating section 107 and modulating section 110. Specifically, when commanded by activation determining section 113 to supply power, power supply section 114 supplies power to demodulating section 107 and modulating section 110, and, when commanded by activation determining section 113 not to supply power, power supply section 114 does not supply power to demodulating section 107 and modulating section 110.

Period determining section 115 determines a period for detecting an access point, based on the GPS information inputted from position information acquiring section 112. Specifically, when the GPS information, inputted from position information acquiring section 112, comes close at a predetermined distance to the WLAN area, period determining section 115 determines to make a period shorter than the case where the GPS information is spaced apart by a predetermined distance from the WLAN area. Then, period determining section 115 outputs information of the determined period to AP detection period control section 116. Here, the position of the GPS information when period determining section 115 determines to make the period shorter, is set at a distance closer to the WLAN area than the position of the GPS information when activation determining section 113 determines activation.

AP detection period control section 116 controls AP detecting section 108 to detect an access point at a predetermined period, based on information of the period inputted from period determining section 115. Specifically, when the GPS information comes close at the predetermined distance to the WLAN area, AP detection period control section 116 performs control so as to detect an access point at a period shorter than the case where the mobile terminal apparatus is spaced apart by a predetermined distance from the WLAN area. Whether or not the GPS information comes close at a predetermined distance to the WLAN area can be decided by, for example, comparing a position of an access point stored in advance and the position of the GPS information.

Figure 3:
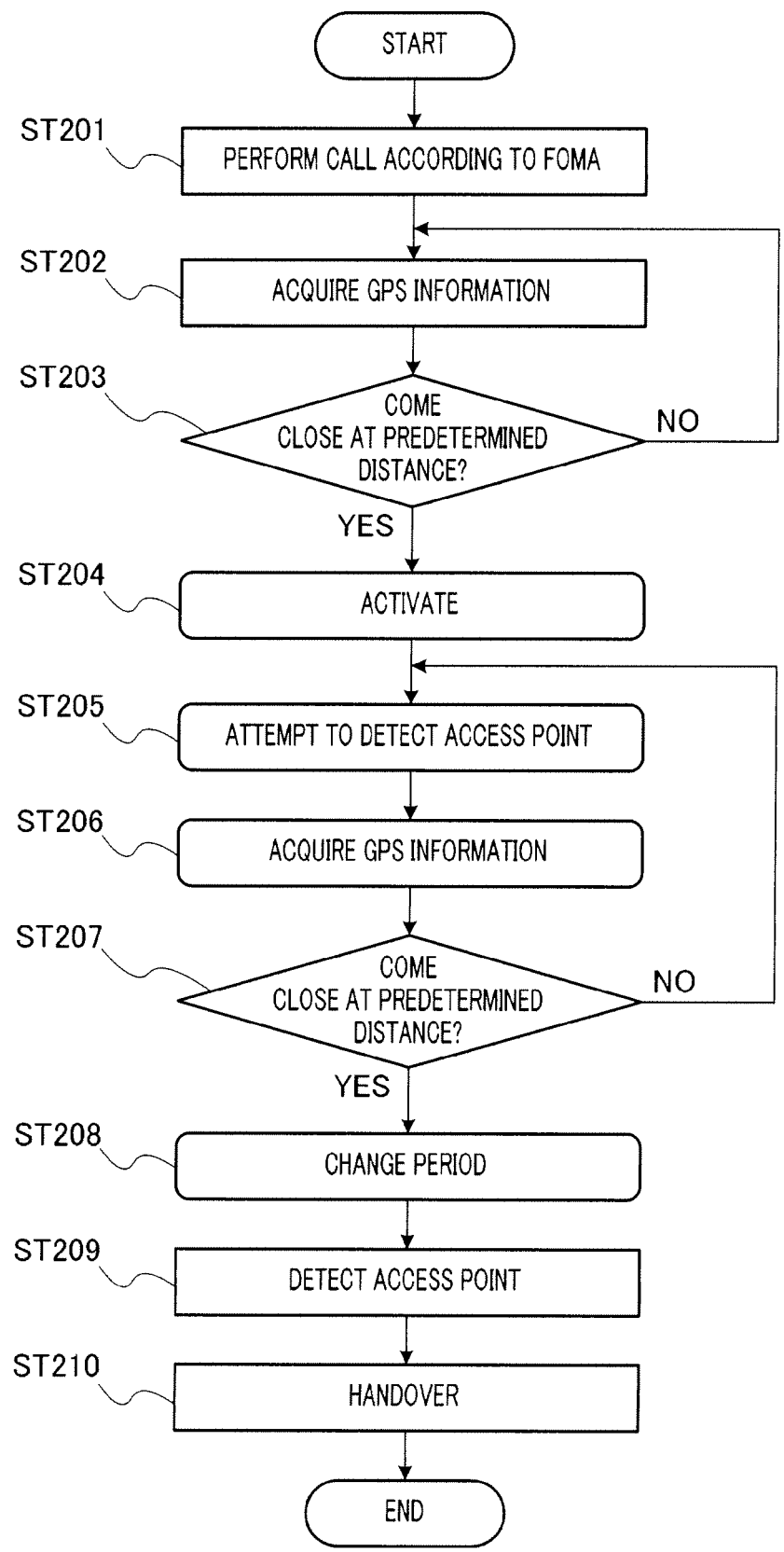
FIG. 3 is a flowchart showing a handover method according to Embodiment 1 of the present invention.
Figure 4:
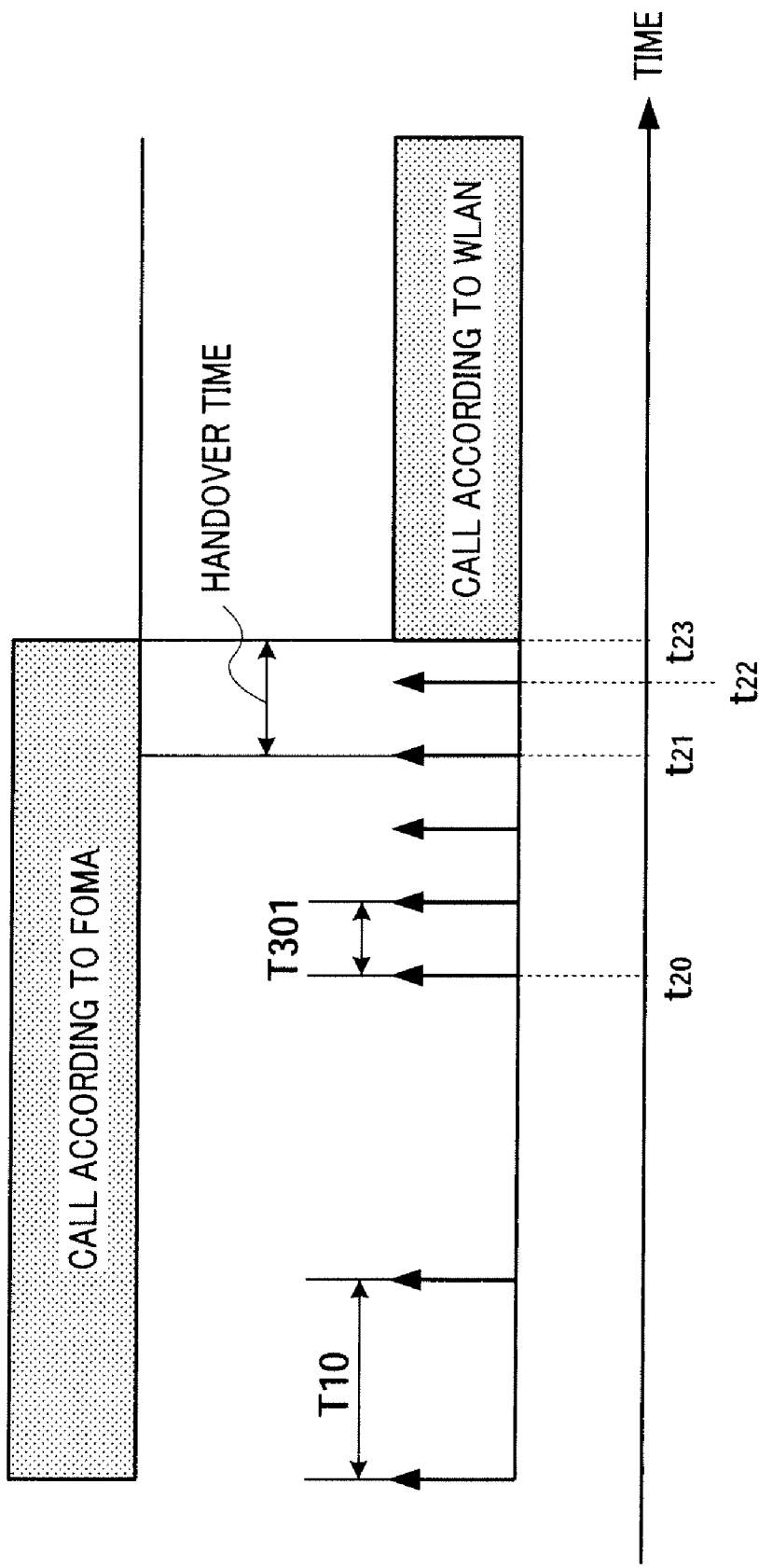
FIG. 4 shows a detection period of an access point according to Embodiment 1 of the present invention.

Next, a method for performing a handover from communication using the third-generation mobile communication system to communication using WLAN will be described with reference to FIG. 3 and FIG. 4. FIG. 3 is a flowchart showing a handover method, and FIG. 4 shows an access point detection period.

First, wireless communication apparatus 100 performs a call according to FOMA using antenna 101 and third-generation mobile communication system processing section 102 (step ST201). Wireless communication apparatus 100 acquires GPS information at position information acquiring section 112 during the call according to FOMA (step ST202).

Next, activation determining section 113 of wireless communication apparatus 100 decides whether or not a position shown by GPS information comes close at a predetermined distance to the WLAN area (step ST203). When the position shown by GPS information comes close at a predetermined distance to the WLAN area, activation determining section 113 determines to activate the WLAN circuit (step ST204). Next, power supply section 114 supplies power to demodulating section 107 and modulating section 110. Consequently, wireless communication apparatus 100 is able to detect an access point. On the other hand, in step ST203, when the position does not come close at a predetermined distance to the WLAN area, activation determining section 113 does not activate the WLAN circuit, and position information acquiring section 112 continuously acquires GPS information at a predetermined timing.

Figure 1:
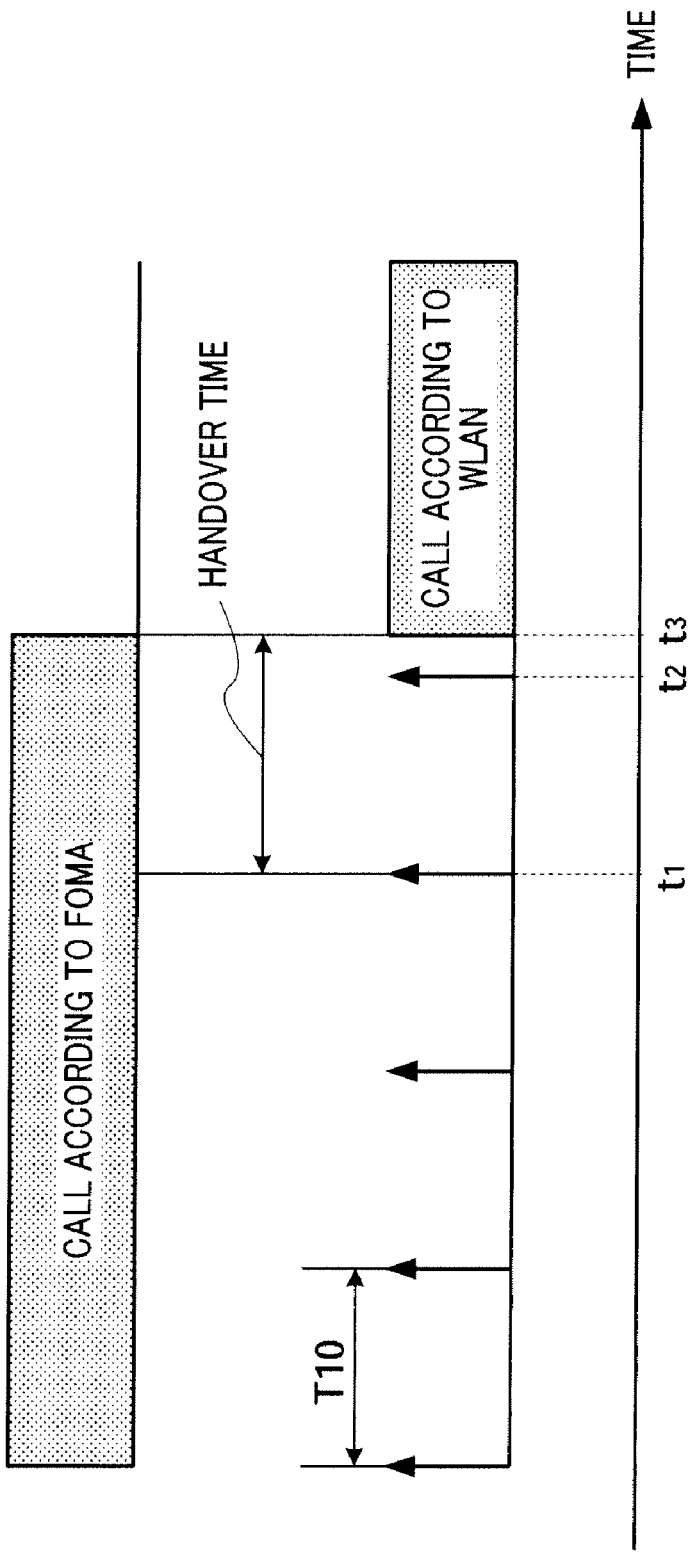
FIG. 1 shows a conventional detection period of an access point.

Next, wireless communication apparatus 100 attempts to detect an access point at AP detecting section 108 after activating the WLAN circuit. As shown in FIG. 4, AP detecting section 108 attempts to detect an access point at the same period T10 as the prior art shown in FIG. 1 (step ST205). Wireless communication apparatus 100 acquires GPS information at a predetermined timing even while an attempt is made to detect an access point (step ST206). Then, every time GPS information is acquired at period determining section 115, wireless communication apparatus 100 decides whether or not the position shown by GPS information comes close at a predetermined distance to the WLAN area (step ST207). Next, when the position comes close at a predetermined distance to the WLAN area, period determining section 115 changes a period for detecting an access point, and then, AP detection period control section 116 performs control so as to attempt to detect an access point at the changed period (step ST208). That is, as shown in FIG. 4, period determining section 115 performs control so as to detect an access point at period T301, which is shorter than period T10, at time t20 at which the position comes close at a predetermined distance to the WLAN area. On the other hand, in step ST207, when the position does not come close at a predetermined distance to the WLAN area, period determining section 115 does not change a period, and so, AP detecting section 108 attempts to detect an access point at period T10 (step ST205), and position information acquiring section 112 continuously acquires GPS information at a predetermined timing (step ST206).

Next, as shown in FIG. 4, wireless communication apparatus 100 moves into the WLAN area at time t21. Next, as a result of attempting to detect an access point at period T301 at AP detecting section 108, wireless communication apparatus 100 having moved into the WLAN area detects an access point at time t22 (step ST209). Then, wireless communication apparatus 100 outputs a handover control signal for performing a handover from a call according to FOMA to a call according to WLAN, and then, performs a handover (step ST210). As a result of the handover, as shown in FIG. 4, wireless communication apparatus 100 performs a handover at time t23. Although a time from time t21 at which wireless communication apparatus 100 has moved into the WLAN area to time t23 at which the handover is performed is a handover time, wireless communication apparatus 100 can reduce a handover time compared to a conventional handover time (a time from time t1 to time t3 of FIG. 1).

In this way, according to this Embodiment 1, when the wireless communication apparatus comes close at a predetermined distance to the WLAN area, a WLAN access point can be detected earlier by reducing a period for detecting an access point, so that it is possible to reduce the handover time, and prevent a connection from being cut during a call. In addition, according to Embodiment 1, when the wireless communication apparatus comes close at a predetermined distance to the WLAN area, the WLAN circuit is activated, so that it is possible to save power consumption. Further, according to Embodiment 1, when both communication using the third-generation mobile communication system and communication using WLAN are available, communication can be switched earlier to WLAN for which call charge is cheaper, so that it is possible to save the call charge.

Further, in Embodiment 1, although both activation determining section 113 and period determining section 115 are provided, the present invention is not limited to this, and either one of activation determining section 113 and period determining section 115 may be provided. Further, in Embodiment 1, although the WLAN circuit is activated by supplying power to demodulating section 107 and modulating section 110, the present invention is not limited to this, and the WLAN circuit may be activated by supplying power to radio receiving section 106, radio transmitting section 111, and the like.

Embodiment 2

Figure 5:
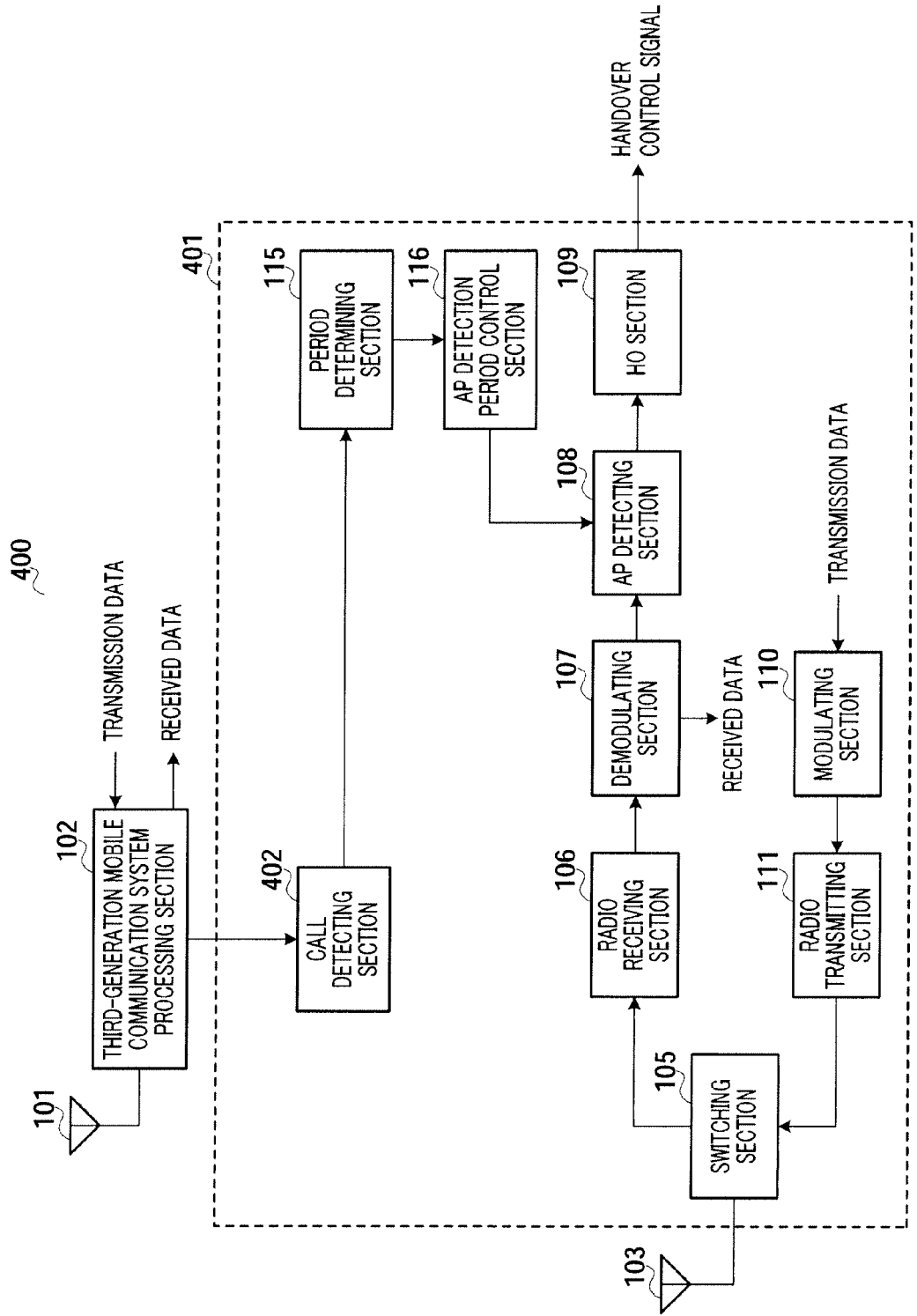
FIG. 5 is a block diagram showing a configuration of a wireless communication apparatus according to Embodiment 2 of the present invention.

FIG. 5 is a block diagram showing a configuration of wireless communication apparatus 400 according to Embodiment 2 of the present invention. Wireless communication apparatus 400 is a communication terminal apparatus such as a mobile telephone.

As shown in FIG. 5, wireless communication apparatus 400 according to Embodiment 2 removes position information acquiring section 112, activation determining section 113, and power supply section 114, and adds call detecting section 402 in wireless communication apparatus 100 according to Embodiment 1 shown in FIG. 2. In FIG. 5, the same components as in FIG. 2 are assigned the same reference numerals without further explanations.

Wireless communication apparatus 400 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 401 that performs signal processing when communication is performed using WLAN. In addition, WLAN processing section 401 includes: switching section 105; radio receiving section 106; demodulating section 107; AP detecting section 108; HO section 109; modulating section 110; radio transmitting section 111; period determining section 115; AP detection period control section 116; and call detecting section 402.

Call detecting section 401 detects that a call has started at third-generation mobile communication system processing section 102, and then, outputs the detection result to period determining section 115.

Period determining section 115 determines a period for detecting an access point, based on the detection result of a call start inputted from call detecting section 401. Specifically, when the detection result of the call start is inputted from call detecting section 401, period determining section 115 determines a period which is shorter than the case where the detection result of the call start is not inputted from call detecting section 401. Then, period determining section 115 outputs information of the determined period to AP detection period control section 116.

Demodulating section 107 demodulates a received signal inputted from radio receiving section 106, and then, outputs the demodulated signal to AP detecting section 108. In addition, demodulating section 107 demodulates the received signal inputted from radio receiving section 106, and then, outputs the demodulated signal as received data.

Modulating section 110 modulates transmission data to generate a transmission signal, and then, outputs the generated transmission signal to radio transmitting section 111.

Next, a method for performing a handover from communication using the third-generation mobile communication system to communication using WLAN will be described.

Wireless communication apparatus 400 monitors whether or not call detecting section 402 detects that a call has started. Then, when it is detected that a call has started, wireless communication apparatus 400 determines to make a period for detecting an access point shorter than conventional period T10 at period determining section 115, and then, AP detection period control section 116 performs control so as to attempt to detect an access point at a period shorter than period T10.

Next, wireless communication apparatus 400 moves into the WLAN area. As a result of attempting to detect an access point at a period shorter than period T10 at AP detecting section 108, wireless communication apparatus 400 having moved into the WLAN area detects an access point. Then, wireless communication apparatus 400 outputs from HO section 109 a handover control signal for performing a handover from the call according to FOMA to the call according to WLAN, and then, performs a handover.

As described above, according to Embodiment 2, when a call start in the third-generation mobile communication system is detected, that is, when a handover is highly likely to be performed during a call in the third-generation mobile communication system, the WLAN access point can be detected earlier by detecting the access point at a period shorter than the conventional period, so that it is possible to reduce a handover time and prevent a connection from being cut during a call. In addition, according to Embodiment 2, when both communication using the third-generation mobile communication system and communication using WLAN are available, communication can be switched earlier to WLAN for which call charge is cheaper, so that it is possible to save the call charge.

Embodiment 3

Figure 6:
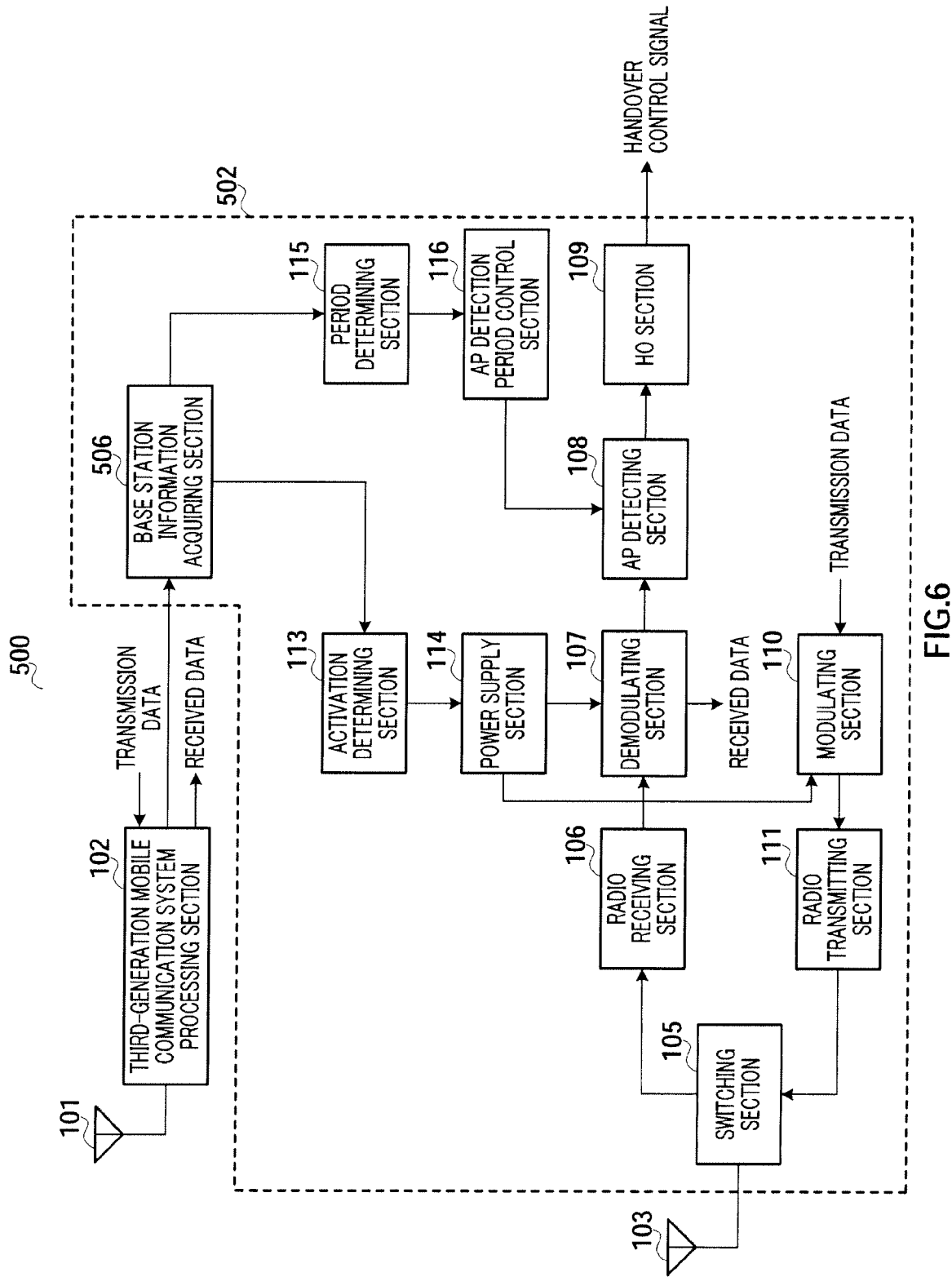
FIG. 6 is a block diagram showing a configuration of a wireless communication apparatus according to Embodiment 3 of the present invention.

FIG. 6 is a block diagram showing a configuration of wireless communication apparatus 500 according to Embodiment 3 of the present invention. Wireless communication apparatus 500 is a communication terminal apparatus such as a mobile telephone.

As shown in FIG. 6, wireless communication apparatus 500 according to Embodiment 3 removes position information acquiring section 112 and adds base station information acquiring section 506 in wireless communication apparatus 100 according to Embodiment 1 shown in FIG. 2. In FIG. 6, the same components as in FIG. 2 are assigned the same reference numerals without further explanations.

Wireless communication apparatus 500 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 502 that performs signal processing when communication is performed using WLAN. In addition, WLAN processing section 502 includes: switching section 105; radio receiving section 106; demodulating section 107; AP detecting section 108; HO section 109; modulating section 110; radio transmitting section 111; activation determining section 113; power supply section 114; period determining section 115; AP detection period control section 116; and base station information acquiring section 506.

Base station information acquiring section 506 acquires base station information included in demodulated received signals inputted from third-generation mobile communication system processing section 102. Then, base station information acquiring section 506 outputs the acquired base station information to activation determining section 113 and period determining section 115. Here, base station information is information for identifying cells.

Activation determining section 113 decides whether or not to activate the WLAN circuit, based on base station information inputted from base station information acquiring section 506. Specifically, activation determining section 113 stores in advance base station information of cells for activating the WLAN circuit near users' home, and, when the base station information inputted from base station information acquiring section 506 matches the stored base station information, commands power supply section 114 to start supplying power. On the other hand, when the base station information inputted from base station information acquiring section 506 does not match the stored base station information, activation determining section 113 commands power supply section 114 not to supply power.

Period determining section 115 determines a period for detecting an access point, based on the base station information inputted from base station information acquiring section 506. Specifically, period determining section 115 stores in advance, base station information of cells near users' home for changing a period, and, when the base station information inputted from base station information acquiring section 506 matches the stored base station information, determines to make a period shorter than the case where the base station information inputted from base station information acquiring section 506 does not match the stored base station information. Then, period determining section 115 outputs information of the determined period to AP detection period control section 116. Here, the base station information when period determining section 115 determines to make the period shorter is base station information of cells closer to the WLAN area than the case where activation determining section 113 determines activation.

Figure 7:
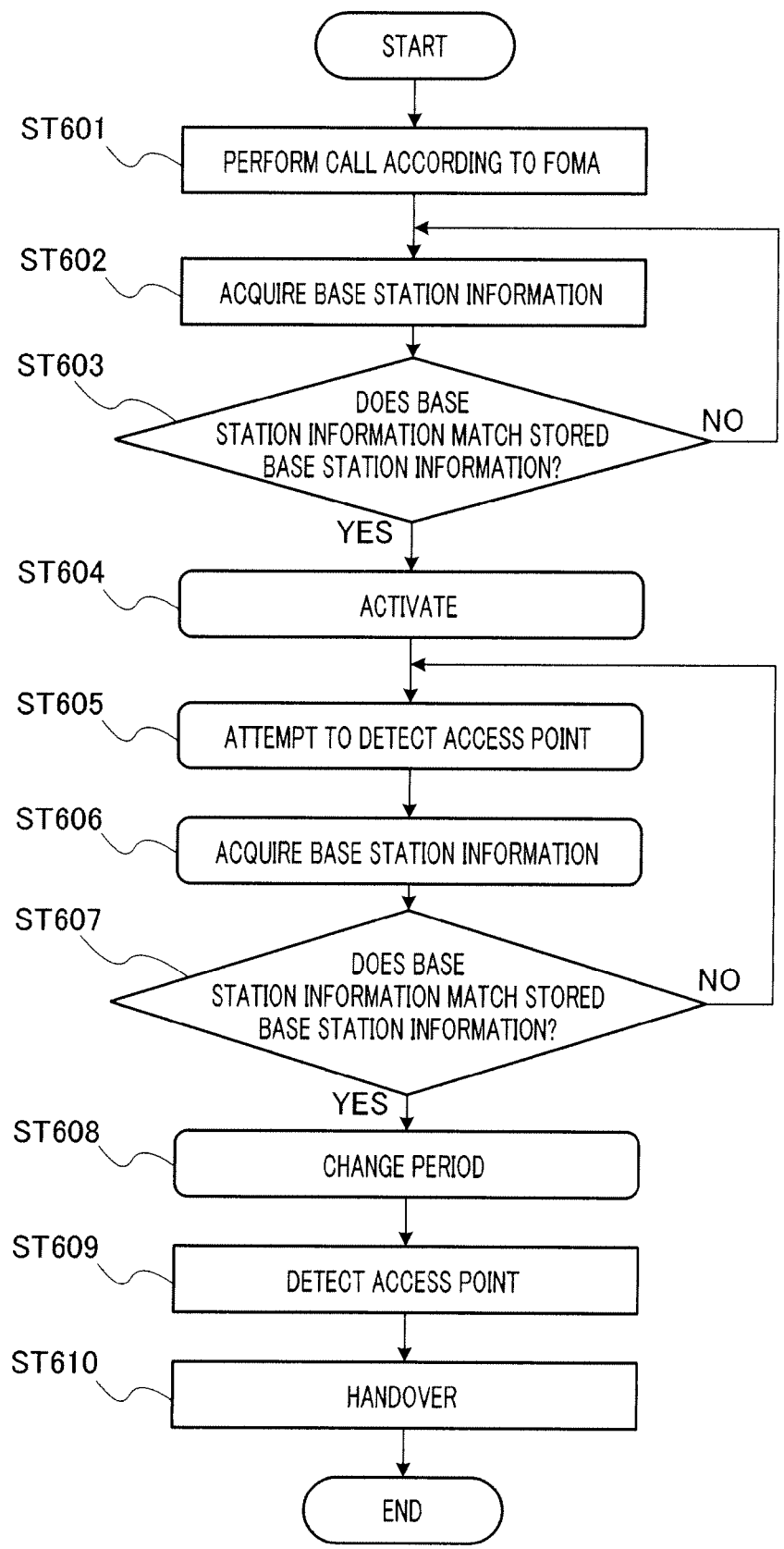
FIG. 7 is a flowchart showing a handover method according to Embodiment 3 of the present invention.

Next, a method for performing a handover from communication using the third-generation mobile communication system to communication using WLAN will be described with reference to FIG. 4 and FIG. 7. FIG. 7 is a flowchart showing a handover method.

First, wireless communication apparatus 500 performs a call according to FOMA using antenna 101 and third-generation mobile communication system processing section 102 (step ST601). Wireless communication apparatus 500 acquires base station information at base station information acquiring section 506 during the call according to FOMA (step ST602).

Next, activation determining section 113 of wireless communication apparatus 500 decides whether or not the base station information acquired at base station information acquiring section 506 matches the base station information stored in advance (step ST603). Activation determining section 113 determines to activate the WLAN circuit when the base station information acquired at base station information acquiring section 506 matches the base station information stored in advance (step ST604). Next, power supply section 114 supplies power to demodulating section 107 and modulating section 110. In this way, wireless communication apparatus 500 is able to detect an access point. On the other hand, in step ST603, when the base station information acquired at base station information acquiring section 506 does not match the base station information stored in advance, activation determining section 113 does not activate the WLAN circuit, and then, base station information acquiring section 506 continuously acquires the base station information at a predetermined timing (step ST602).

Next, wireless communication apparatus 500 attempts to detect an access point at AP detecting section 108 after activating the WLAN circuit. As shown in FIG. 4, AP detecting section 108 attempts to detect an access point at the same period T10 as the prior art shown in FIG. 1 (step ST605). Wireless communication apparatus 500 acquires base station information at a predetermined timing even while an attempt is made to detect an access point (step S606). Then, period determining section 115 of wireless communication apparatus 500 decides whether or not the base station information acquired at base station information acquiring section 506 matches the base station information stored in advance (step ST607). Next, when the base station information acquired at base station information acquiring section 506 matches the base station information stored in advance, period determining section 115 changes a period for detecting an access point, and then, performs control so as to attempt to detect an access point at the changed period (step ST608). That is, as shown in FIG. 4, period determining section 115 changes a period so as to detect an access point at period T301, which is shorter than period T10, at time t20 at which the base station information acquired at base station information acquiring section 506 matches the base station information stored in advance. On the other hand, in step ST607, when the base station information acquired at base station information acquiring section 506 does not match the base station information stored in advance, period determining section 115 does not change a period, and so, AP detecting section 108 attempts to detect an access point at period T10 (step ST605), and then, base station information acquiring section 506 continuously acquires the base station information at a predetermined timing (step ST606).

Next, as shown in FIG. 4, wireless communication apparatus 500 moves into the WLAN area at time t21. Next, as a result of attempting to detect an access point at period T301 at AP detecting section 108, wireless communication apparatus 500 having moved into the WLAN area detects an access point at time t22 (step ST609). Then, wireless communication apparatus 500 outputs from HO section 109 a handover control signal for performing a handover from the call according to FOMA to the call according to WLAN, and then, performs a handover (step ST610). As a result of the handover, as shown in FIG. 4, wireless communication apparatus 500 performs a handover at time t23. As shown in FIG. 4, although a time from time t21 at which wireless communication apparatus 500 has moved into the WLAN area to time t23 at which the handover is performed, is defined as a "handover time," wireless communication apparatus 500 is able to reduce a handover time compared to the conventional handover time (a time from time t1 to time t3 of FIG. 1).

In this way, according to Embodiment 3, base station information showing cells close to the WLAN area is stored in advance, and then, when the acquired base station information matches the stored base station information, the WLAN access point can be detected earlier by reducing a period for detecting an access point, so that it is possible to reduce a handover time and prevent a connection from being cut during a call. In addition, according to Embodiment 3, when the base station information comes close at a predetermined distance to the WLAN area, the WLAN circuit is activated, so that it is possible to save power consumption. Further, according to Embodiment 3, when both communication using the third-generation mobile communication system and communication using WLAN are available, communication can be switched earlier to WLAN for which call charge is cheaper, so that it is possible to save the call charge.

Further, in Embodiment 3, although both activation determining section 113 and period determining section 115 are provided, the present invention is not limited to this, and either one of activation determining section 113 and period determining section 115 may be provided. In addition, in Embodiment 3, although the WLAN circuit is activated by supplying power to demodulating section 107 and modulating section 110, the present invention is not limited to this, and the WLAN circuit may be activated by supplying power to radio receiving section 106, radio transmitting section 111, and the like.

Embodiment 4

Figure 8:
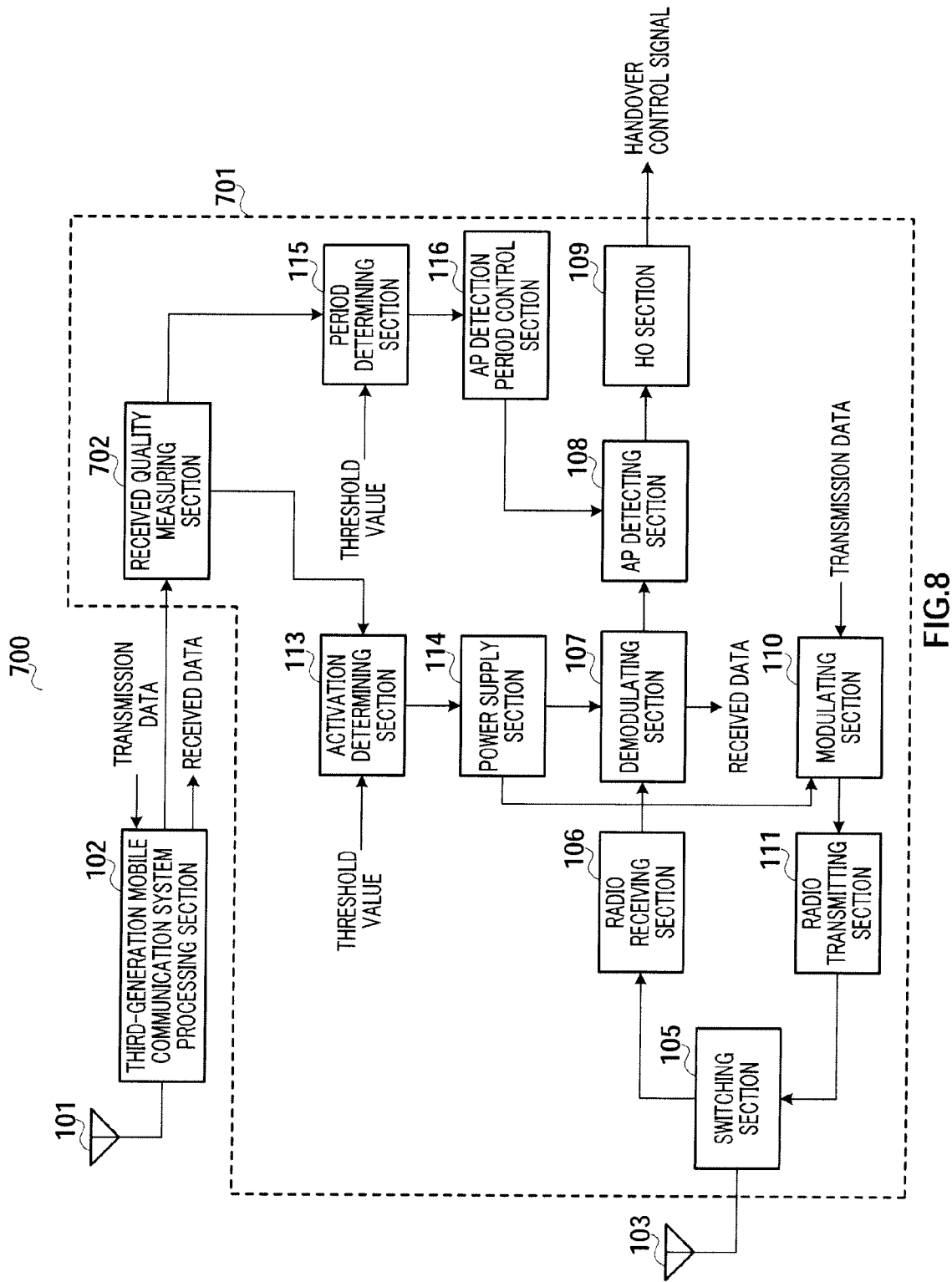
FIG. 8 is a block diagram showing a configuration of a wireless communication apparatus according to Embodiment 4 of the present invention.

FIG. 8 is a block diagram showing a configuration of wireless communication apparatus 700 according to Embodiment 4 of the present invention. Wireless communication apparatus 700 is a communication terminal apparatus such as a mobile telephone.

As shown in FIG. 8, wireless communication apparatus 700 according to Embodiment 4 removes position information acquiring section 112 and adds received quality measuring section 702 in wireless communication apparatus 100 according to Embodiment 1 shown in FIG. 2. In FIG. 8, the same components as in FIG. 2 are assigned the same reference numerals without further explanations.

Wireless communication apparatus 700 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 701 that performs signal processing when communication is performed using WLAN. In addition, WLAN processing section 701 includes: switching section 105; radio receiving section 106; demodulating section 107; AP detecting section 108; HO section 109; modulating section 110; radio transmitting section 111; activation determining section 113; power supply section 114; period determining section 115; AP detection period control section 116; and received quality measuring section 702.

Received quality measuring section 702 measures RSSI (Received Signal Strength Indicator) showing received quality using a demodulated pilot signal inputted from third-generation mobile communication system processing section 102. Then, received quality measuring section 702 outputs the RSSI measurement result to activation determining section 113 and period determining section 115. Further, received quality is not limited to the RSSI, and it is also possible to use arbitrary parameters such as the SIR (Signal to Interference Ratio).

Activation determining section 113 decides whether or not to activate the WLAN circuit, based on a result of comparing the RSSI measurement result inputted from received quality measuring section 702 with a threshold value. Specifically, when the RSSI measurement value is less than the threshold value, that is, when the received quality deteriorates, activation determining section 113 commands power supply section 114 to start supplying power. On the other hand, when the RSSI measurement value is the threshold value or greater, that is, when received quality is good, activation determining section 113 commands power supply section 114 not to supply power.

Period determining section 115 determines a period for detecting an access point based on a result of comparing the RSSI measurement result inputted from received quality measuring section 702 with the threshold value. Specifically, when the RSSI measurement value is less than the threshold value, that is, when the received quality deteriorates, period determining section 115 determines a period shorter than the case where the RSSI measurement value is the threshold value or greater, that is, the case where received quality is good. Then, period determining section 115 outputs information of the determined period to AP detection period control section 116. Here, the RSSI measurement result when period determining section 115 determines to make the period shorter, represents received quality inferior to the RSSI measurement result when activation determining section 113 determines activation.

Figure 9:
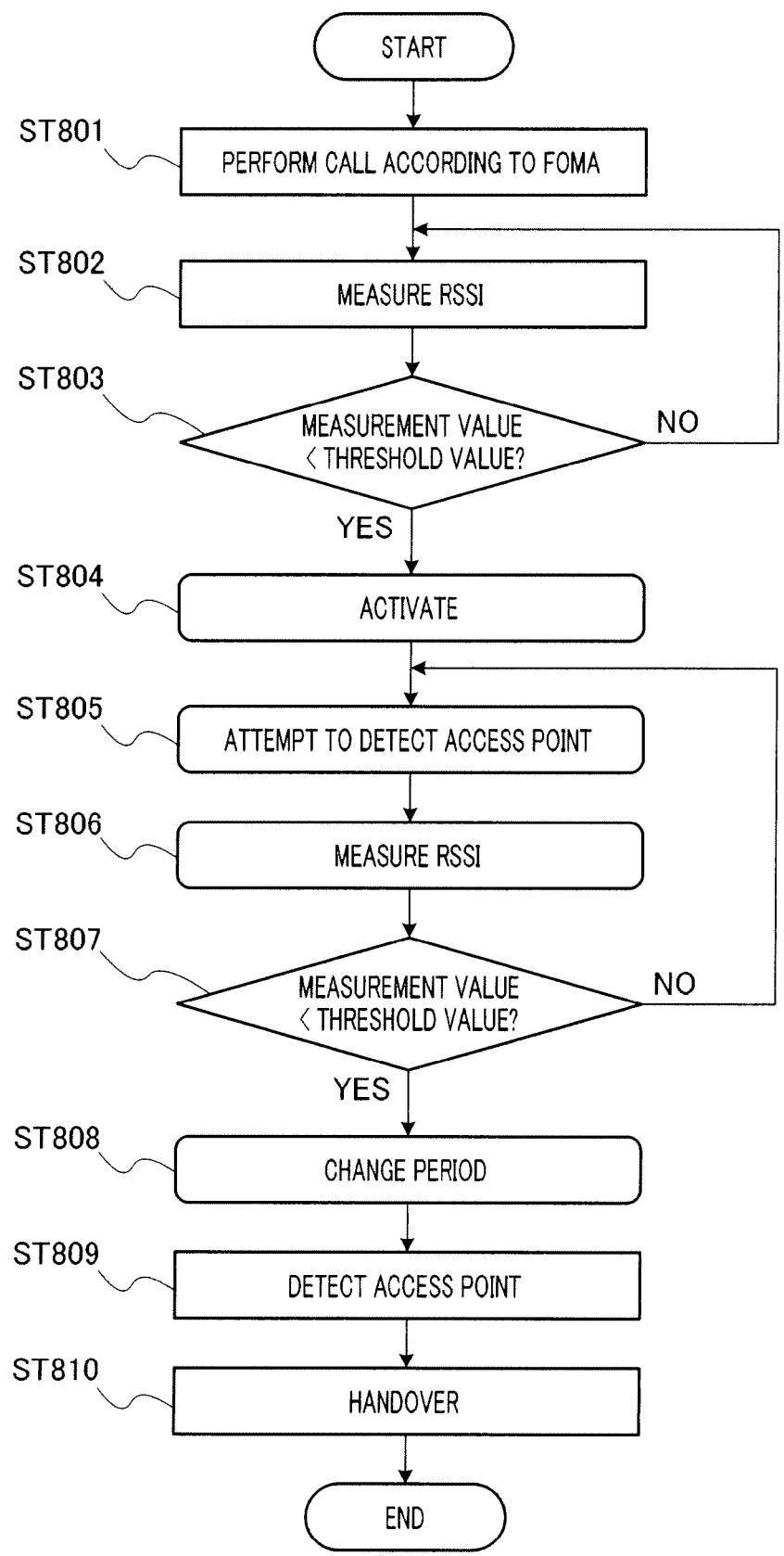
FIG. 9 is a flowchart showing a handover method according to Embodiment 4 of the present invention.

Next, a method for performing a handover from communication using a third-generation mobile communication system to communication using WLAN will be described with reference to FIG. 9 and FIG. 4. FIG. 9 is a flowchart showing a handover method.

First, wireless communication apparatus 700 performs a call according to FOMA using antenna 101 and third-generation mobile communication system processing section 102 (step ST801). Wireless communication apparatus 700 measures the RSSI at received quality measuring section 702 during the call according to FOMA (step ST802).

Next, activation determining section 113 of wireless communication apparatus 700 decides whether or not the RSSI measurement value is less than the threshold value (step ST803). Activation determining section 113 activates the WLAN circuit when the RSSI measurement value is less than the threshold value (step ST804). Next, power supply section 114 supplies power to demodulating section 107 and modulating section 110. In this way, wireless communication apparatus 700 is activated in order to start communication using WLAN. On the other hand, in step ST803, when the RSSI measurement result is not less than the threshold value, activation determining section 113 does not activate the WLAN circuit, received quality measuring section 702 continuously measures the RSSI (step ST802), and then, activation determining section 113 decides whether or not the RSSI measurement value is less than the threshold value every time the RSSI is measured (step ST803).

Next, wireless communication apparatus 700 attempts to detect an access point at AP detecting section 108. As shown in FIG. 4, AP detecting section 108 attempts to detect an access point at the same period T10 as the prior art shown in FIG. 1 (step ST805). Wireless communication apparatus 700 measures the RSSI at a predetermined timing even while an attempt is made to detect an access point (step ST806). Then, period determining section 115 of wireless communication apparatus 700 compares the RSSI measurement value with the threshold value every time the RSSI is measured (step ST807). Next, when the RSSI measurement value is less than the threshold value, period determining section 115 changes a period for detecting an access point, and AP detection period control section 116 performs control so as to attempt to detect an access point at the changed period (step ST808). That is, as shown in FIG. 4, period determining section 115 changes a period so as to detect an access point at period 301, which is shorter than period T10, at time t20 at which the RSSI measurement value becomes less than the threshold value. On the other hand, in step ST807, when the RSSI measurement value is not less than the threshold value, period determining section 115 does not change a period, and thus, AP detecting section 108 attempts to detect an access point at period T10 (step ST805). Even while an attempt is made to detect an access point at period T10, received quality measuring section 702 continuously measures the RSSI (step ST806), and then, period determining section 115 compares the RSSI measurement value with the threshold value every time the RSSI is measured (step ST807).

Next, as shown in FIG. 4, wireless communication apparatus 700 moves into the WLAN area at time t21. Next, as a result of attempting to detect an access point at period T301 at AP detecting section 108, wireless communication apparatus 700 having moved into the WLAN area detects an access point at time t22 (step ST809). Then, wireless communication apparatus 700 outputs from HO section 109 a handover control signal for performing a handover from the call according to FOMA to the call according to WLAN, and then, performs a handover (step ST810). As a result of the handover, as shown in FIG. 4, wireless communication apparatus 700 performs a handover at time t23. As shown in FIG. 4, although a time from time t21 at which wireless communication apparatus 700 has moved into the WLAN area to time t23 at which the handover is performed, is defined as a "handover time," wireless communication apparatus 700 can reduce a handover time compared to the conventional handover time (a time from time t1 to time t3 of FIG. 1).

Although, a case has been described with FIG. 8 and FIG. 9 where one threshold value is compared with the RSSI measurement result, the present invention is not limited to this, and a period may be changed based on each result of comparing a plurality of threshold values with an RSSI measurement result. FIG. 10 shows a relationship between a threshold value and a period when a period is changed based on each result of comparing a plurality of threshold values with the RSSI measurement result. As shown in FIG. 10, when the threshold value becomes low in accordance with a change from RSSI threshold value (A) to RSSI threshold value (D), the period is set to be shorter in accordance with a change from period T(A) to period T(D). That is, when received quality deteriorates more significantly, a period is set shorter. As shown in FIG. 10, period determining section 115 selects a period by storing period change information obtained by associating a threshold value with a period, and then, referring to period change information using an RSSI measurement result inputted from received quality measuring section 702.

In this way, according to Embodiment 4, when, by moving from, for example, the surface to the underground where only WLAN can be used during a call using the third-generation mobile communication system, received quality of a call using the third-generation mobile communication system deteriorates, the WLAN access point can be detected earlier by reducing a period for detecting an access point, so that it is possible to reduce a handover time and prevent a connection from being cut during a call. In addition, according to Embodiment 4, when the received quality of a call using the third-generation mobile communication system deteriorates during a call using the third-generation mobile communication system, the WLAN circuit is activated, so that it is possible to save power consumption. Further, according to Embodiment 4, when both communication using the third-generation mobile communication system and communication using WLAN are available, communication can be switched earlier to WLAN for which call charge is cheaper, so that it is possible to save the call charge.

Further, in Embodiment 4, although both activation determining section 113 and period determining section 115 are provided, the present invention is not limited to this, and either one of activation determining section 113 and period determining section 115 may be provided. In addition, in Embodiment 4, although the WLAN circuit is activated by supplying power to demodulating section 107 and modulating section 110, the present invention is not limited to this, and the WLAN circuit may be activated by supplying power to radio receiving section 106, radio transmitting section 111, and the like.

Embodiment 5

Figure 11:
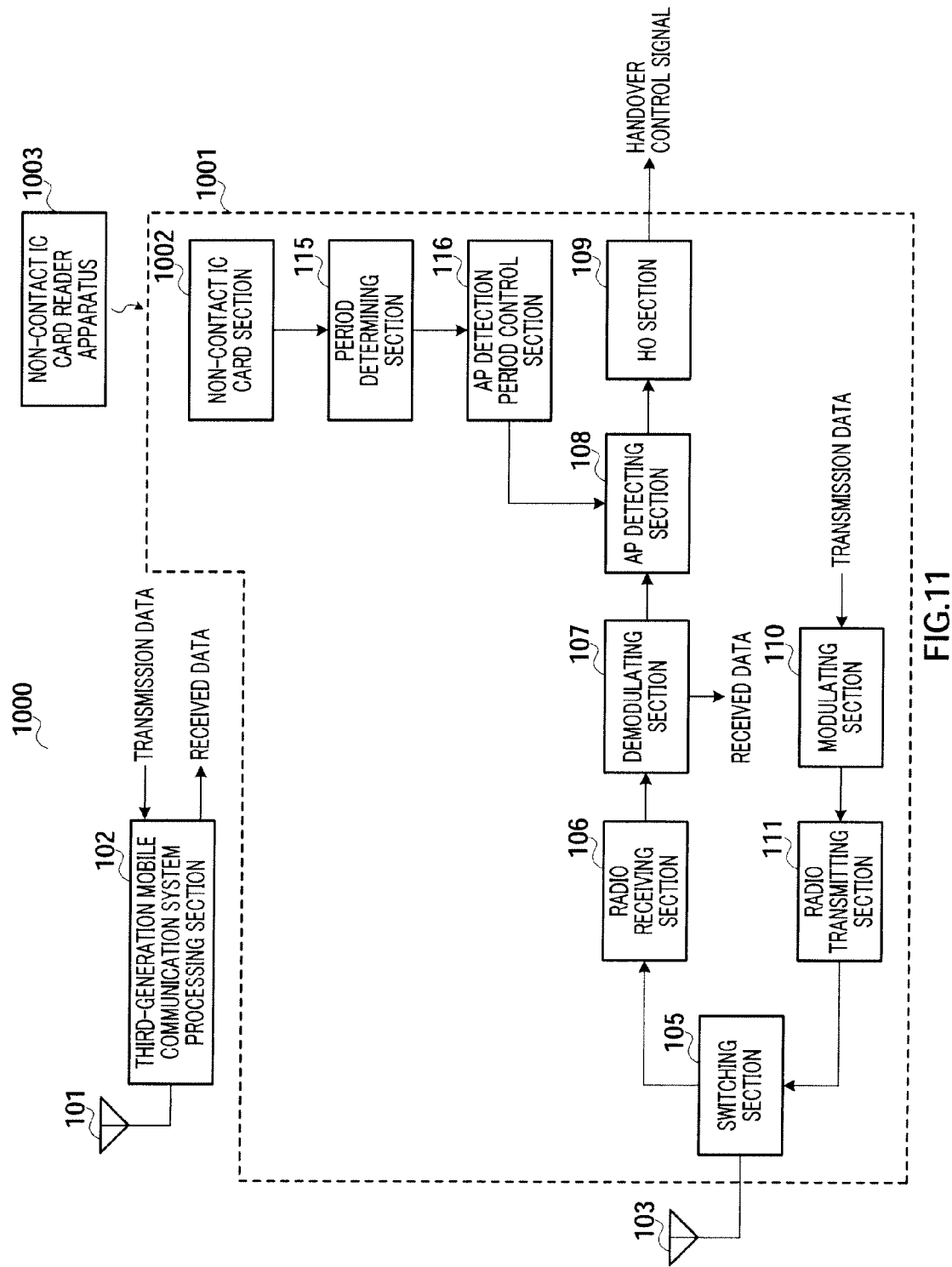
FIG. 11 is a block diagram showing a configuration of a wireless communication apparatus according to Embodiment 5 of the present invention.

FIG. 11 is a block diagram showing a configuration of wireless communication apparatus 1000 according to Embodiment 5 of the present invention. Wireless communication apparatus 1000 is a communication terminal apparatus such as a mobile telephone.

As shown in FIG. 11, wireless communication apparatus 1000 according to Embodiment 5 removes position information acquiring section 112, activation determining section 113 and power supply section 114, and adds non-contact IC card section 1002 in wireless communication apparatus 100 according to Embodiment 1 shown in FIG. 2. In FIG. 11, the same components as in FIG. 2 are assigned the same reference numerals without further explanations.

Wireless communication apparatus 1000 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1001 that performs signal processing when communication is performed using WLAN. In addition, WLAN processing section 1001 includes: switching section 105; radio receiving section 106; demodulating section 107; AP detecting section 108; HO section 109; modulating section 110; radio transmitting section 111; period determining section 115; AP detection period control section 116; and non-contact IC card section 1102.

Non-contact IC card section 1002 detects start of communication with non-contact IC card reader apparatus 1003 equipped in automatic ticket checker at a station, and then, when the start of communication is detected, outputs information showing that communication has been started, to period determining section 115. For example, when coming close to non-contact IC reader apparatus 1003, non-contact IC card section 1002 detects a magnetic field generated from non-contact IC card reader apparatus 1003 as the start of communication. Then, non-contact IC card section 1002 outputs information showing that the magnetic field has been detected, to period determining section 115. Then, when the magnetic field is detected, non-contact IC card section 1002 updates information such as an amount of money written in an IC card. The information to be written in non-contact IC card section 1002 is not limited to the amount of money and may be any information.

Period determining section 115 determines a period for detecting an access point, based on information which is inputted from non-contact IC card section 1002 and which shows that communication has been started. Specifically, when the information showing that communication has been started is inputted, period determining section 115 determines a period shorter than the case where information showing that communication has been started is not inputted. Then, period determining section 115 outputs information of the determined period to AP detection period control section 116.

Next, a method for performing a handover from communication using a third-generation mobile communication system to communication using WLAN will be described.

Wireless communication apparatus 1000 monitors the start of communication with non-contact card reader apparatus 1003, at non-contact IC card section 1002. Then, when the start of the communication is detected, wireless communication apparatus 1000 determines to make a period for detecting an access point shorter than conventional period T10 at period determining section 115, and AP detection period control section 116 performs control so as to attempt to detect an access point at a period shorter than period T10.

Next, wireless communication apparatus 1000 moves into the WLAN area. As a result of attempting to detect an access point at a period shorter than period T10 at AP detecting section 108, wireless communication apparatus 1000 having moved into the WLAN area detects an access point. Then, wireless communication apparatus 1000 outputs from HO section 109 a handover control signal for performing a handover from the call according to FOMA to the call according to WLAN, and then, performs a handover.

In this way, according to Embodiment 5, when the start of communication with the non-contact IC card reader apparatus is detected, the WLAN access point can be detected earlier by detecting an access point at a period shorter than a conventional period when, for example, users pass through a ticket gate of the nearest station from users' home on their way home, so that it is possible to reduce a handover time when, for example, WLAN is used at home. In addition, according to Embodiment 5, when the start of communication with the non-contact IC card reader apparatus is detected, an access point is detected at a period shorter than a conventional period, when, for example, users move into an underground where only WLAN can be used, through a ticket gate at station, so that it is possible to prevent connection from being cut during a call. Further, according to Embodiment 5, the WLAN access point can be detected earlier by detecting an access point at a period shorter than a conventional period when users pass through a ticket gate of the nearest station from their home on their way home from the outside, so that, when WLAN can be used at home, it is possible to switch earlier to WLAN for which call charge is cheaper, and reduce users' cost of a call.

Embodiment 6

Figure 12:
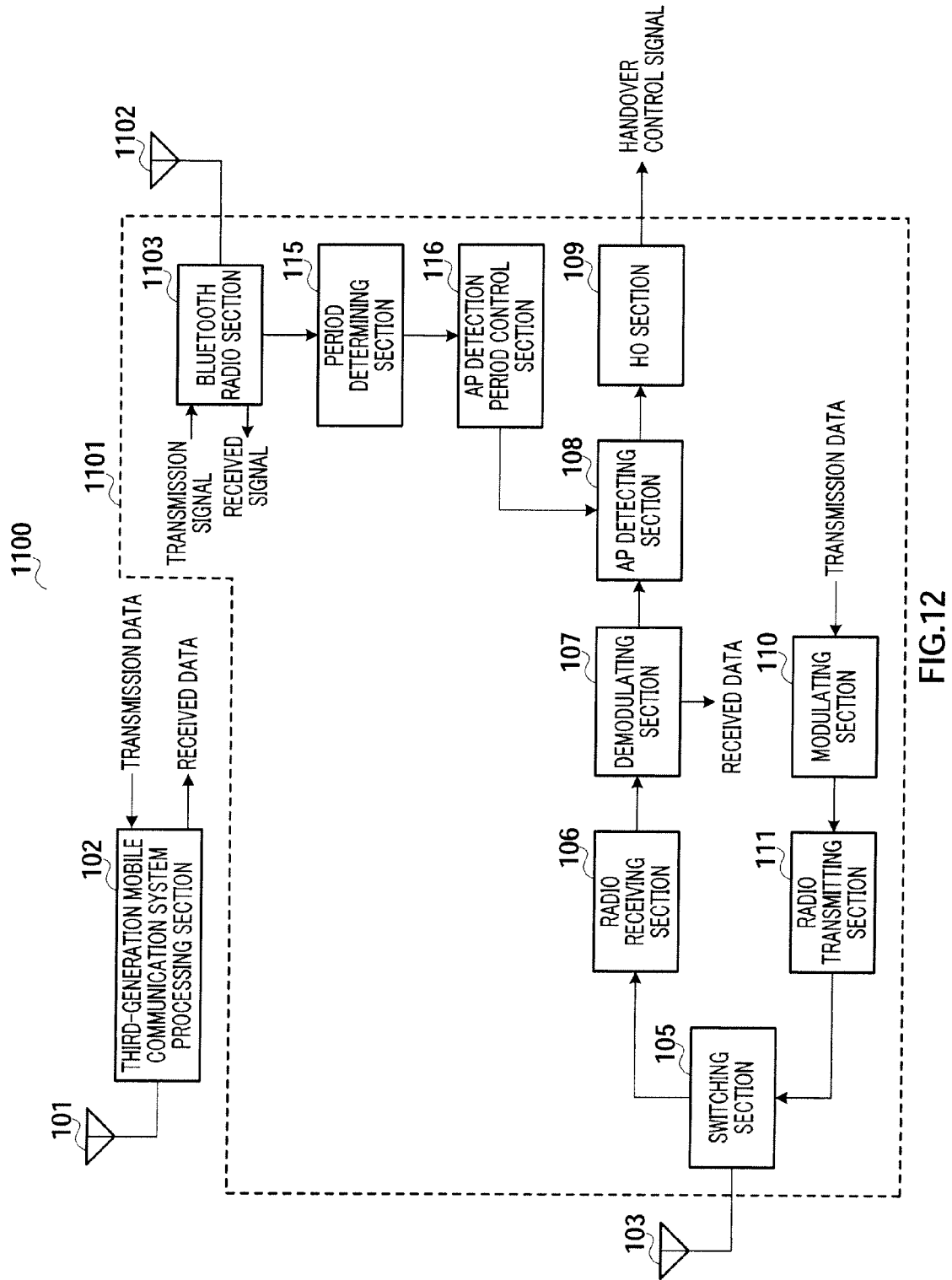
FIG. 12 is a block diagram showing a configuration of a wireless communication apparatus according to Embodiment 6 of the present invention.

FIG. 12 is a block diagram showing a configuration of wireless communication apparatus 1100 according to Embodiment 6 of the present invention. Wireless communication apparatus 1100 is a communication terminal apparatus such as a mobile telephone.

As shown in FIG. 12, wireless communication apparatus 1100 according to Embodiment 6 removes position information acquiring section 112, activation determining section 113 and power supply section 114, and adds antenna 1102 and Bluetooth (registered trademark) radio section 1103 in wireless communication apparatus 100 according to Embodiment 1 shown in FIG. 2. In FIG. 12, the same components as in FIG. 2 are assigned the same reference numerals without further explanations.

Wireless communication apparatus 1100 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1101 that performs signal processing when communication is performed using WLAN. In addition, WLAN processing section 1101 includes: switching section 105; radio receiving section 106; demodulating section 107; AP detecting section 108; HO section 109; modulating section 110; radio transmitting section 111; period determining section 115; AP detection period control section 116; antenna 1102; and Bluetooth radio section 1103.

Antenna 1102 outputs a received signal according to a Bluetooth communication scheme, to Bluetooth radio section 1103, and then, transmits a signal according to the Bluetooth communication scheme inputted from Bluetooth radio section 1103.

Bluetooth radio section 1103 performs signal processing according to the Bluetooth communication scheme on the signal inputted from antenna 1102 and the signal to be transmitted from antenna 1102. In addition, when the signal according to the Bluetooth communication scheme is inputted from antenna 1102, Bluetooth radio section 1103 outputs information showing that communication is performed by Bluetooth, to period determining section 115.

When it is detected that communication is performed by Bluetooth, period determining section 115 determines a period shorter than the case where it is not detected that communication is performed by Bluetooth. That is, when information showing that communication is performed by Bluetooth is inputted from Bluetooth radio section 1103, period determining section 115 determines a period shorter than the case where information showing that communication is performed by Bluetooth is not inputted. Then, period determining section 115 outputs information of the determined period to AP detection period control section 116.

Next, a method for performing a handover from communication using the third-generation mobile communication system to communication using WLAN will be described.

Wireless communication apparatus 1100 monitors whether or not to perform signal processing according to the Bluetooth communication scheme at Bluetooth radio section 1103. Then, when it is detected that signal processing according to the Bluetooth communication is performed, wireless communication apparatus 1100 determines to make a period for detecting an access point shorter than conventional period T10 at period determining section 115, and then, AP detection period control section 116 performs control so as to attempt to detect an access point at a period shorter than period T10.

Next, wireless communication apparatus 1100 moves into the WLAN area. As a result of attempting to detect an access point at a period shorter than period T10 at AP detecting section 108, wireless communication apparatus 1100 having moved into the WLAN area detects an access point. Then, wireless communication apparatus 1100 outputs from HO section 109 a handover control signal for performing a handover from the call according to FOMA to the call according to WLAN, and then, performs a handover.

By the way, a case of performing communication by Bluetooth refers to, for example, a case where wireless communication apparatus 1100 is used as being hands-free in a vehicle. When wireless communication apparatus 1100 is used in a vehicle, the velocity of the vehicle is fast, and an access point needs to be searched quickly, and so, it is necessary to reduce a search period of an access point.

In this way, according to Embodiment 6, when the start of communication according to the Bluetooth communication scheme is detected, the WLAN access point can be detected earlier by detecting an access point at a period shorter than a conventional period, so that, when, for example, a hands-free call is performed using Bluetooth while driving a vehicle, it is possible to reduce a handover time and prevent a connection from being cut during a call. In addition, according to Embodiment 6, when both communication using the third-generation mobile communication system and communication using WLAN are available, communication can be switched earlier to WLAN for which call charge is cheaper, so that it is possible to save the call charge.

Embodiment 7

Figure 13:
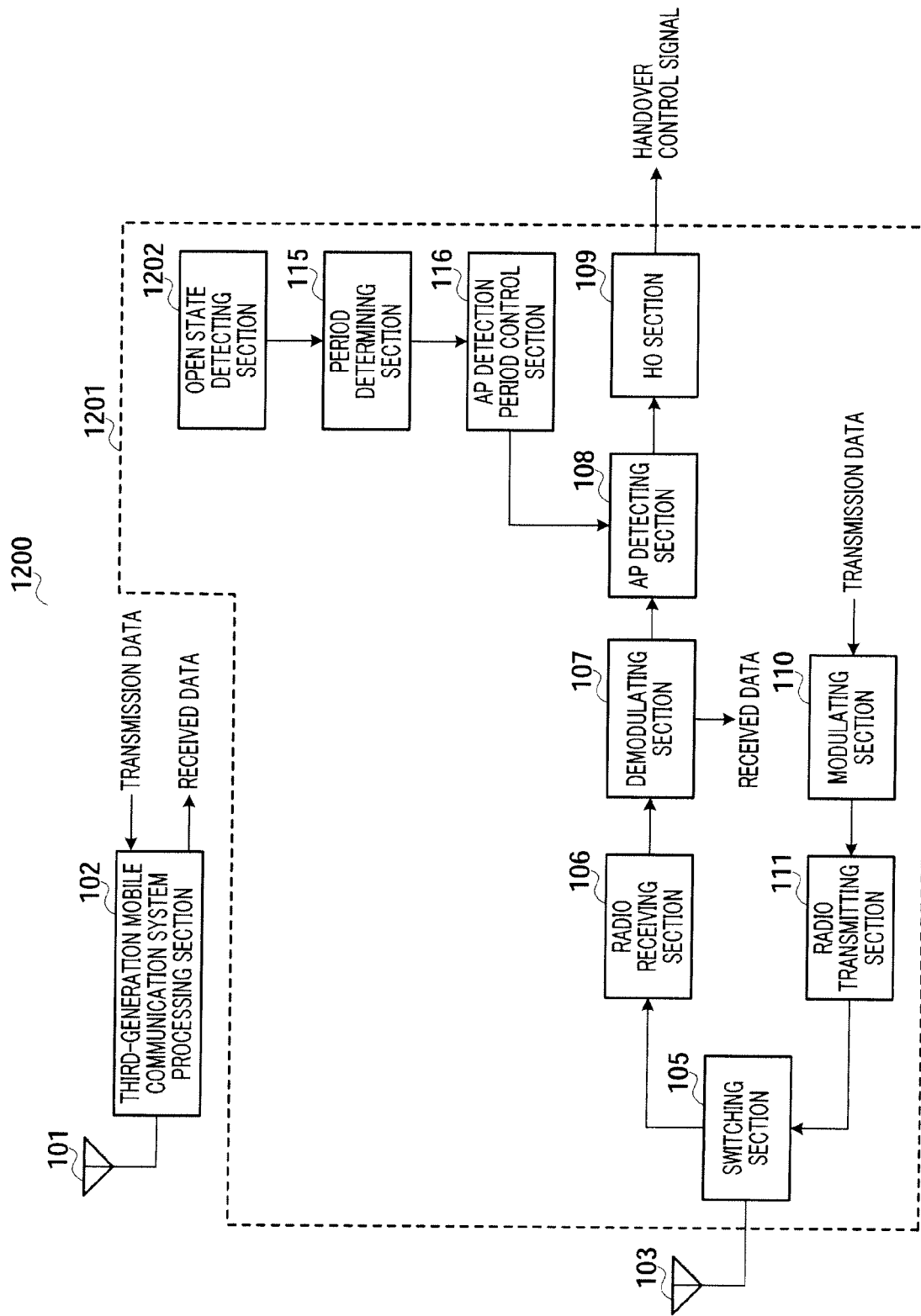
FIG. 13 is a block diagram showing a configuration of a wireless communication apparatus according to Embodiment 7 of the present invention.

FIG. 13 is a block diagram showing a configuration of wireless communication apparatus 1200 according to Embodiment 7 of the present invention. Wireless communication apparatus 1200 is a communication terminal apparatus such as a mobile telephone.

As shown in FIG. 13, wireless communication apparatus 1200 according to Embodiment 7 removes position information acquiring section 112, activation determining section 113 and power supply section 114, and adds open state detecting section 1202 in wireless communication apparatus 100 according to Embodiment 1 shown in FIG. 2. In FIG. 13, the same components as in FIG. 2 are assigned the same reference numerals without further explanations.

Wireless communication apparatus 1200 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1201 that performs signal processing when communication is performed using WLAN. In addition, WLAN processing section 1201 includes: switching section 105; radio receiving section 106; demodulating section 107; AP detecting section 108; HO section 109; modulating section 110; radio transmitting section 111; period determining section 115; AP detection period control section 116; and open state detecting section 1202.

Open state detecting section 1202 detects that a folded state of a case of wireless communication apparatus 1200 is changed to an open state. Then, when detecting an open state of the case, open state detecting section 1202 outputs information showing that the case is open, to period determining section 115.

Period determining section 115 determines a period for detecting an access point based on information which is inputted from open state detecting section 1202 and which shows that the case is open. Specifically, when the information showing that the case is open is inputted, period determining section 115 determines a period shorter than the case where the information showing that the case is open is not inputted. Then, period determining section 115 outputs information of the determined period to AP detection period control section 116.

Next, a method for performing a handover from communication using the third-generation mobile communication system to communication using WLAN will be described.

Open state detecting section 1202 of wireless communication apparatus 1200 monitors whether the case is folded or open. Then, when it is detected that the case is open, wireless communication apparatus 1200 determines at period determining section 115 to make a period for detecting an access point shorter than conventional period T10, and AP detection period control section 116 performs control so as to attempt to detect an access point at a period shorter than period T10.

Next, wireless communication apparatus 1200 moves into the WLAN area. As a result of attempting to detect an access point at a period shorter than period T10 at AP detecting section 108, wireless communication apparatus 1200 having moved into the WLAN area detects an access point. Then, wireless communication apparatus 1200 outputs from HO section 109 a handover control signal for performing the call according to FOMA to the call according to WLAN, and then, performs a handover.

Figure 14:
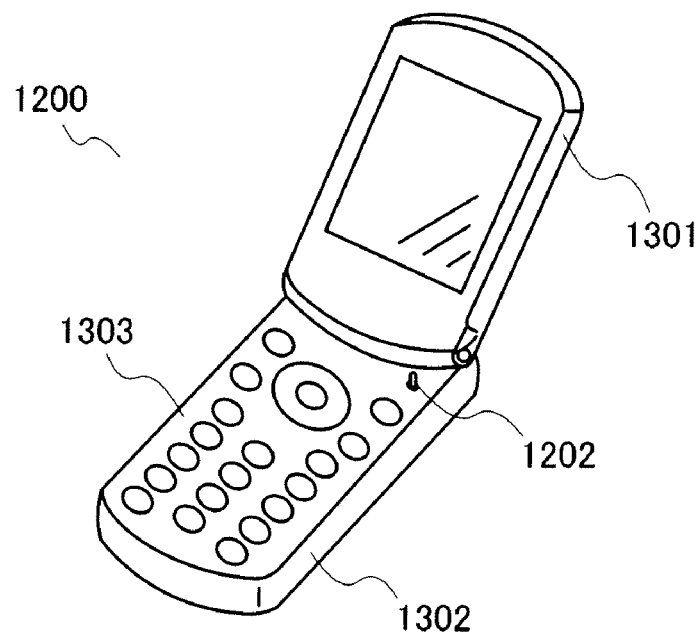
FIG. 14 shows a case of a wireless communication apparatus according to Embodiment 7 of the present invention.
Figure 15:
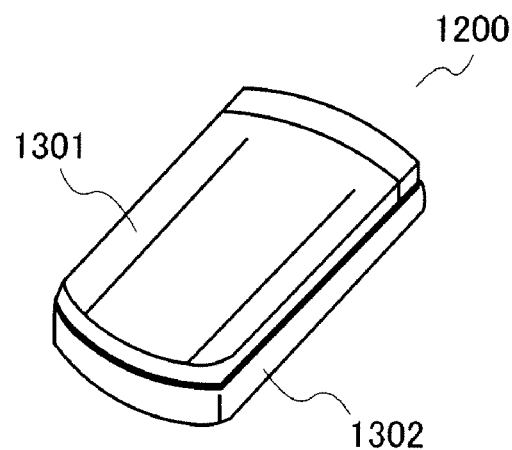
FIG. 15 shows a case of a wireless communication apparatus according to Embodiment 7 of the present invention.

FIG. 14 and FIG. 15 show the cases of wireless communication apparatus 1200. The case of wireless communication apparatus 1200 is opened upon a call as shown in FIG. 14, and the case is folded as shown in FIG. 15 where no call is made. Therefore, when the case is opened, wireless communication 1200 is used during a call or to start a call.

In wireless communication apparatus 1200, upper case 1301 and lower case 1302 are integrally formed rotatably by hinges. Open state detecting section 1202 protrudes from operating face 1303 of lower case 1302 and is mounted to lower case 1302 so as to be freely protruded and recessed with respect to operating face 1303. When the folded state of wireless communication apparatus 1200 is changed to the open state, open state detecting section 1202 pressed by upper case 1301 into operating surface 1303 protrudes from operating face 1303, so that it is possible to detect that the case is open.

In this way, according to Embodiment 7, when it is detected that the case is open, that is, when a call is started in the third-generation mobile communication system where a handover is highly likely to be performed, the WLAN access point can be detected earlier by detecting an access point at a period shorter than a conventional period, so that it is possible to reduce a handover time and prevent a connection from being cut during a call. In addition, according to Embodiment 7, when both communication using the third-generation mobile communication system and communication using WLAN are available, communication can be switched earlier to WLAN for which call charge is cheaper, so that it is possible to save the call charge.

Embodiment 8

Figure 16:
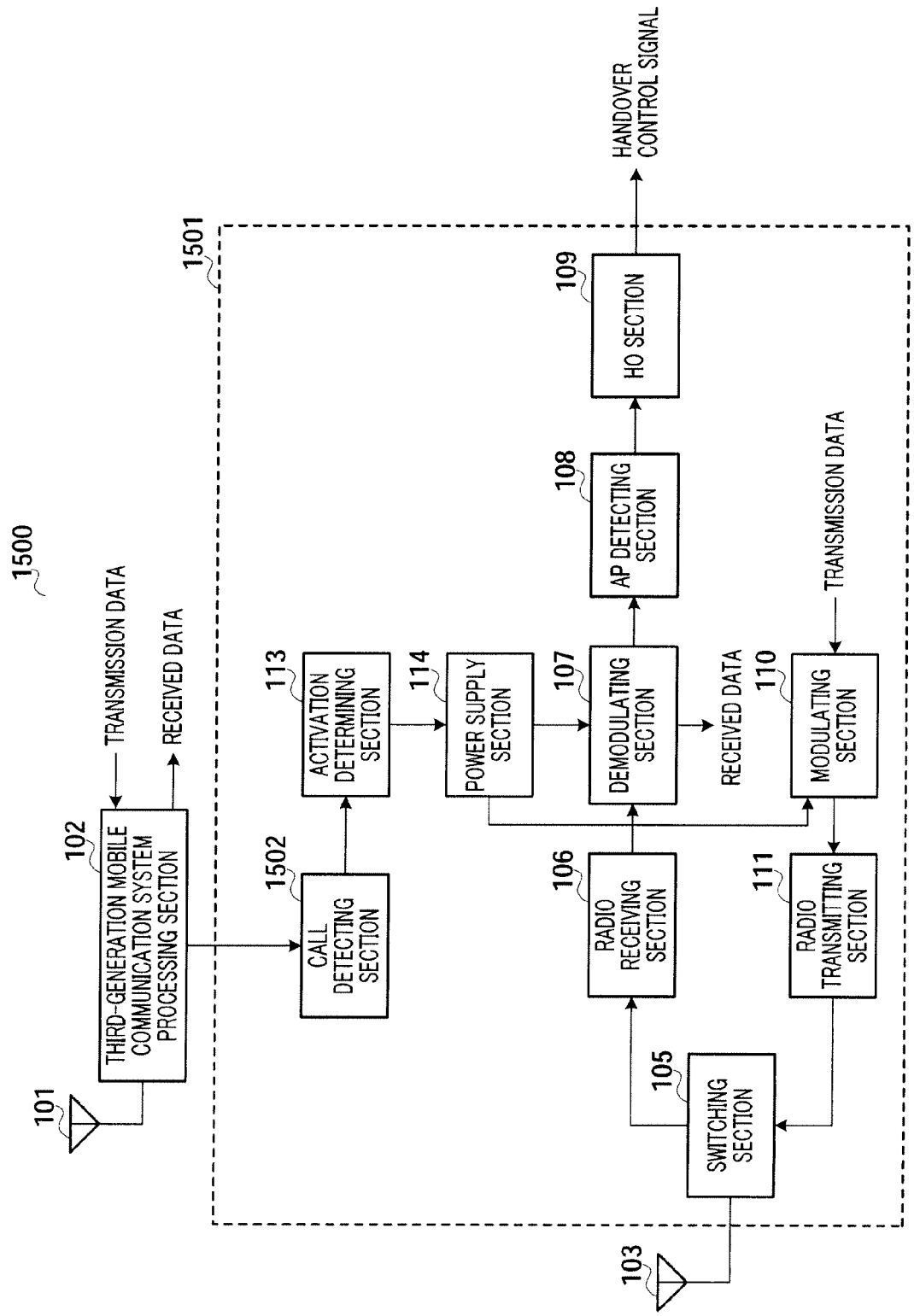
FIG. 16 is a block diagram showing a configuration of a wireless communication apparatus according to Embodiment 8 of the present invention.

FIG. 16 is a block diagram showing a configuration of wireless communication apparatus 1500 according to Embodiment 8 of the present invention. Wireless communication apparatus 1500 is a communication terminal apparatus such as a mobile telephone.

As shown in FIG. 16, wireless communication apparatus 1500 according to Embodiment 8 removes position information acquiring section 112, period determining section 115 and AP detection period control section 116, and adds call detecting section 1502 in wireless communication apparatus 100 according to Embodiment 1 shown in FIG. 2. In FIG. 16, the same components as in FIG. 2 are assigned the same reference numerals without further explanations.

Wireless communication apparatus 1500 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1501 that performs signal processing when communication is performed using WLAN. In addition, WLAN processing section 1501 includes: switching section 105; radio receiving section 106; demodulating section 107; AP detecting section 108; HO section 109; modulating section 110; radio transmitting section ill; activation determining section 113; power supply section 114; and call detecting section 1502.

Call detecting section 1502 detects that a call has been started at third-generation mobile communication system processing section 102, and then, outputs a detection result to activation determining section 113.

Activation determining section 113 determines whether or not to activate the WLAN circuit, based on the detection result inputted from call detecting section 1502. Specifically, when the detection result showing that a call has been started is inputted from call detecting section 1502, activation determining section 113 commands power supply section 114 to start supplying power. On the other hand, when the detection result showing that a call has been started is not inputted from call detecting section 1502, activation determining section 113 commands power supply section 114 not to supply power.

AP detecting section 108 attempts to detect an access point using a received signal inputted from demodulating section 107 at a predetermined period, and when the access point is successfully detected, outputs information showing that the access point has been successfully detected, to HO section 109. A specific method for detecting the access point is the same as in above Embodiment 1, and so, repetition of description is omitted here.

In this way, according to Embodiment 8, the WLAN circuit is activated after starting a call in the third-generation mobile communication system, so that it is possible to save power consumption.

Further, in Embodiment 8, although the WLAN circuit is activated by supplying power to demodulating section 107 and modulating section 110, the present invention is not limited to this, and the WLAN circuit may be activated by supplying power to radio receiving section 106, radio transmitting section 111, and the like.

Embodiment 9

Figure 17:
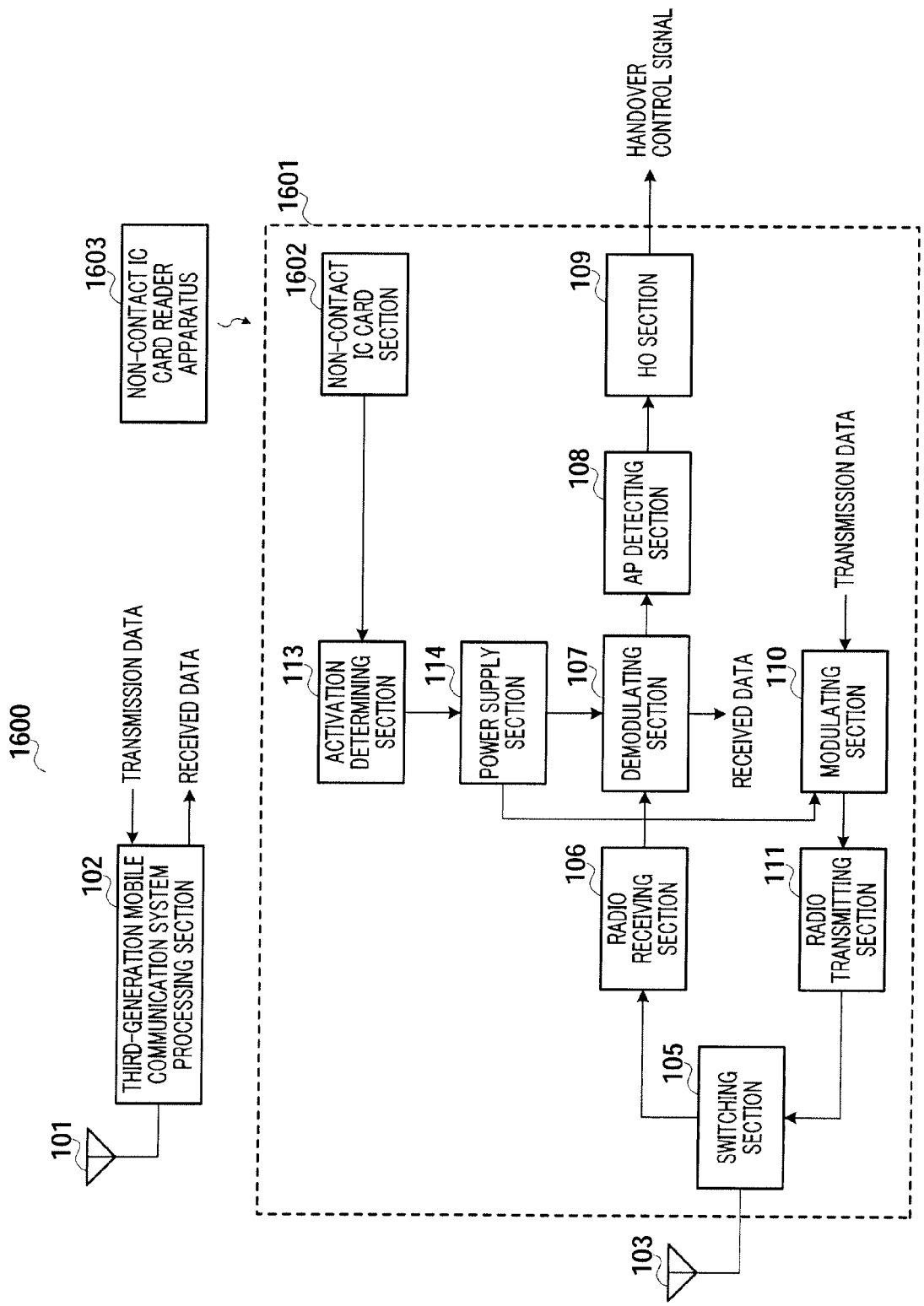
FIG. 17 is a block diagram showing a configuration of a wireless communication apparatus according to Embodiment 9 of the present invention.

FIG. 17 is a block diagram showing a configuration of wireless communication apparatus 1600 according to Embodiment 9 of the present invention. Wireless communication apparatus 1600 is a communication terminal apparatus such as a mobile telephone.

As shown in FIG. 17, wireless communication apparatus 1600 according to Embodiment 9 removes position information acquiring section 112, period determining section 115 and AP detection period control section 116, and adds non-contact IC card section 1602 in wireless communication apparatus 100 according to Embodiment 1, shown in FIG. 2. In FIG. 17, the same components as in FIG. 2 are assigned the same reference numerals without further explanations.

Wireless communication apparatus 1600 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1601 that performs signal processing when communication is performed using WLAN. In addition, WLAN processing section 1601 includes: switching section 105; radio receiving section 106; demodulating section 107; AP detecting section 108; HO section 109; modulating section 110; radio transmitting section 111; activation determining section 113; power supply section 114; and non-contact IC card section 1602.

Non-contact IC card section 1602 detects the start of communication with non-contact IC card reader apparatus 1603 equipped in an automatic ticket checker at a station, and, when the start of communication is detected, outputs information showing that communication has been started, to activation determining section 113. For example, when coming closer to non-contact IC card reader apparatus 1603, non-contact IC card section 1602 detects a magnetic field generated from non-contact IC card reader apparatus 1603 as the start of communication. Then, non-contact IC card section 1602 outputs information showing that communication has been started, to activation determining section 113. In addition, when the start of communication is detected, non-contact IC card section 1602 updates information such as an amount of money written in an IC card. The information written in non-contact IC card section 1602 is not limited to the amount of money and may be any information.

Activation determining section 113 decides whether or not to activate the WLAN circuit, based on information showing that communication with non-contact card reader apparatus 1603 has been started, from non-contact IC card section 1602. Specifically, when information showing that the start of communication has been detected is inputted, activation determining section 113 commands power supply section 114 to start supplying power. On the other hand, when the information showing that the start of communication has been detected is not inputted, activation determining section 113 commands power supply section 114 not to supply power.

AP detecting section 108 attempts to detect an access point using a received signal inputted from demodulating section 107 at a predetermined period, and, when the access point is successfully detected, outputs the information showing that the access point has been successfully detected, to HO section 109. A specific method for detecting the access point is the same as in above Embodiment 1, and so, repetition of description is omitted here.

In this way, according to Embodiment 9, when the start of communication with the non-contact IC card reader apparatus is detected, the WLAN circuit is activated, so that it is possible to save power consumption.

Further, in Embodiment 9, although the WLAN circuit is activated by supplying power to demodulating section 107 and modulating section 110, the present invention is not limited to this, and the WLAN circuit may be activated by supplying power to radio receiving section 106, radio transmitting section 111, and the like.

Embodiment 10

Figure 18:
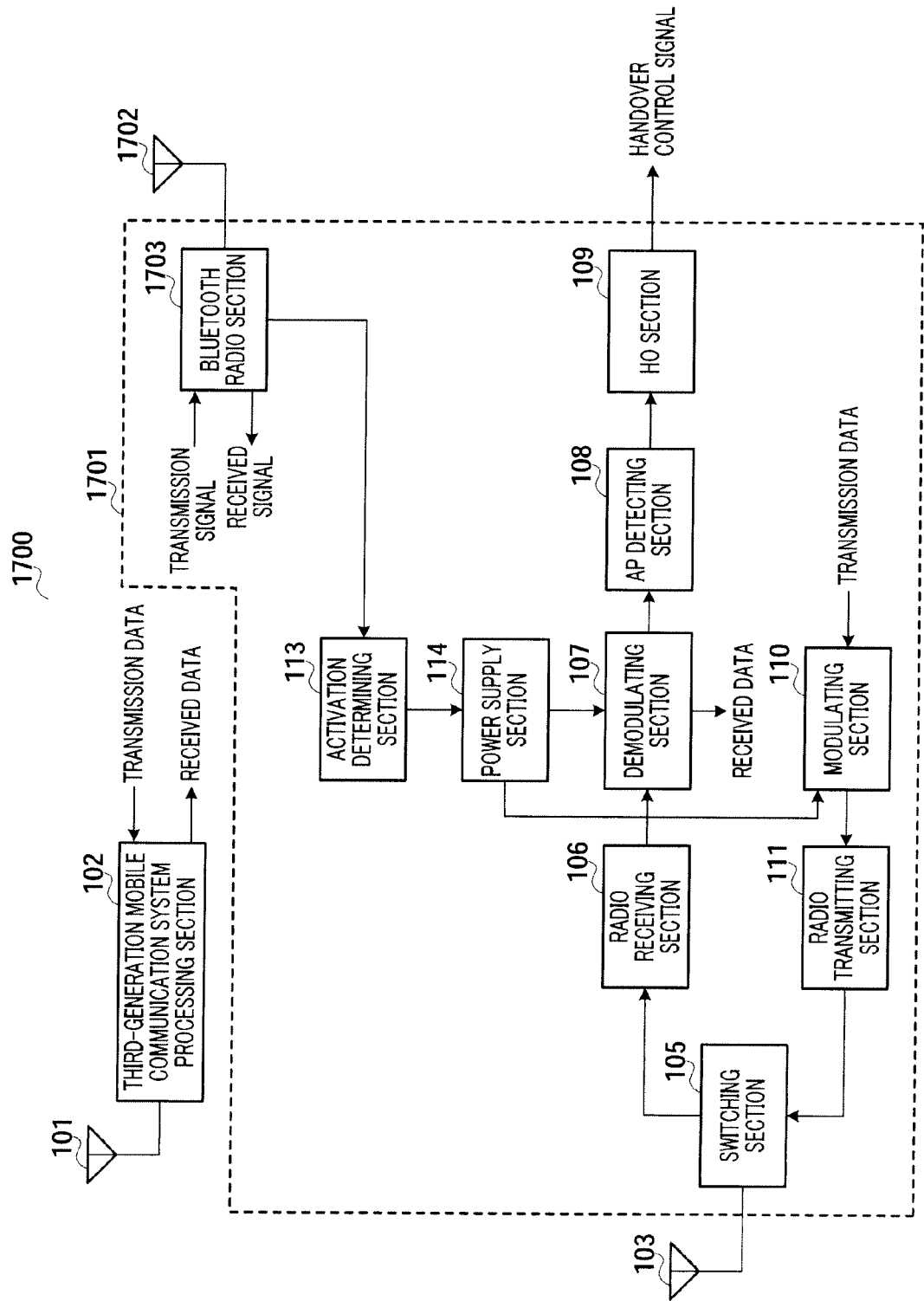
FIG. 18 is a block diagram showing a configuration of a wireless communication apparatus according to Embodiment 10 of the present invention.

FIG. 18 is a block diagram showing a configuration of wireless communication apparatus 1700 according to Embodiment 10 of the present invention. Wireless communication apparatus 1700 is a communication terminal apparatus such as a mobile telephone.

As shown in FIG. 18, wireless communication apparatus 1700 according to Embodiment 10 removes position information acquiring section 112, period determining section 115 and AP detection period control section 116, and adds antenna 1702 and Bluetooth radio section 1703 in wireless communication apparatus 100 according to Embodiment 1 shown in FIG. 2. In FIG. 18, the same components as in FIG. 2 are assigned the same reference numerals without further explanations.

Wireless communication apparatus 1700 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1701 that performs signal processing when communication is performed using WLAN. In addition, WLAN processing section 1701 includes: switching section 105; radio receiving section 106; demodulating section 107; AP detecting section 108; HO section 109, modulating section 110; radio transmitting section 111; activation determining section 113; power supply section 114; antenna 1702; and Bluetooth radio section 1703.

Antenna 1702 outputs a received signal according to the Bluetooth communication scheme to Bluetooth radio section 1703, and then, transmits the signal according to the Bluetooth scheme inputted from Bluetooth radio section 1703.

Bluetooth radio section 1703 performs signal processing according to the Bluetooth communication scheme on the signal inputted from antenna 1702 and the signal outputted to antenna 1702. In addition, when the signal according to the Bluetooth communication scheme is inputted from antenna 1702, Bluetooth radio section 1703 outputs the information showing that communication is performed by Bluetooth, to activation determining section 113.

Activation determining section 113 determines activation when communication by Bluetooth is detected. That is, when the information showing that communication is performed by Bluetooth is inputted from Bluetooth radio section 1703, activation determining section 113 commands power supply section 114 to start supplying power. On the other hand, when the information showing that communication is performed by Bluetooth is not inputted, activation determining section 113 commands power supply section 114 not to supply power.

AP detecting section 108 attempts to detect an access point using a received signal inputted from demodulating section 107 at a predetermined period, and, when the access point is successfully detected, outputs the information showing that the access point has been successfully detected, to HO section 109. A specific method for detecting the access point is the same as in above Embodiment 1, and so, repetition of description is omitted here.

By the way, a case of performing communication by Bluetooth refers to a case where wireless communication apparatus 1700 is used as "hands-free" in a vehicle. When wireless communication apparatus 1700 is used in a vehicle, the velocity of the vehicle is fast and the access point needs to be searched quickly, and so it is necessary to reduce the search period of the access point.

In this way, according to Embodiment 10, when the start of communication according to the Bluetooth communication scheme is detected, for example, WLAN is activated when a hands-free call is performed using Bluetooth while driving a vehicle, so that it is possible to save the power consumption.

Further, in Embodiment 10, although the WLAN circuit is activated by supplying power to demodulating section 107 and modulating section 110, the present invention is not limited to this, and the WLAN circuit may be activated by supplying power to radio receiving section 106, radio transmitting section 107, and the like.

Embodiment 11

FIG. 19 is a block diagram showing a configuration of wireless communication apparatus 1800 according to Embodiment 11 of the present invention. Wireless communication apparatus 1800 is a communication terminal apparatus such as a mobile telephone.

As shown in FIG. 19, wireless communication apparatus 1800 according to Embodiment 11 removes position information acquiring section 112, period determining section 115 and AP detection period control section 116, and adds open state detecting section 1802 in wireless communication apparatus 100 according to Embodiment 1 shown in FIG. 2. In FIG. 19, the same components as in FIG. 2 are assigned the same reference numerals without further explanations.

Wireless communication apparatus 1800 includes: antenna 101 that transmits and receives a signal when communication is performed using a third-generation mobile communication system such as FOMA; third-generation mobile communication system processing section 102 that performs signal processing when communication is performed using the third-generation mobile communication system; antenna 103 that transmits and receives a signal when communication is performed using WLAN; and WLAN processing section 1801 that performs signal processing when communication is performed using WLAN. In addition, WLAN processing section 1801 includes: switching section 105; radio receiving section 106; demodulating section 107; AP detecting section 108; HO section 109; modulating section 110; radio transmitting section 111; activation determining section 113; power supply section 114; and open state detecting section 1802.

Open state detecting section 1802 detects that the folded state of the case of wireless communication apparatus 1700 is changed to the open state. Then, when the open state is detected, open state detecting section 1802 outputs information showing that the case is open, to activation detecting section 113.

Activation determining section 113 decides whether or not to activate the WLAN circuit, based on the information which is inputted from open state detecting section 1202 and which shows that the case is open. Specifically, when the information showing that the case is open is inputted, activation determining section 113 commands power supply section 114 to start supplying power. On the other hand, when information showing that the case is folded is inputted, activation determining section 113 commands power supply section 114 not to supply power. The case of wireless communication apparatus 1700 is the same as in FIG. 13 and FIG. 14, and so, repetition of description is omitted here.

AP detecting section 108 attempts to detect an access point using a received signal inputted from demodulating section 107 at a predetermined period, and then, when the access point is successfully detected, outputs the information showing that the access point has been successfully detected, to HO section 109. A specific method for detecting the access point is the same as in above Embodiment 1, and so, repetition of description is omitted here.

In this way, according to Embodiment 11, when the case is detected to be open, a WLAN circuit is activated, so that it is possible to save power consumption.

Further, in Embodiment 11, although the WLAN circuit is activated by supplying power to demodulating section 107 and modulating section 110, the present invention is not limited to this, and the WLAN circuit may be activated by supplying power to radio receiving section 106, radio transmitting section 107, and the like.

In above Embodiments 1 to 11, the third-generation mobile communication system is not limited to WCDMA, and any scheme of the third generation mobile communication system may be employed.

The present application is based on Japanese Patent Application No. 2005-270443, filed on Sep. 16, 2005, the entire content of which is expressly incorporated by reference herein.

INDUSTRIAL APPLICABILITY

A wireless communication apparatus and a handover method according to the present invention are suitable, in particular, for a handover from communication using a third-generation mobile communication system such as WCDMA to communication using WLAN.

What is claimed is:

1. A wireless communication apparatus comprising:
a period control section configured to control a period for detecting an access point of a wireless local area network;
an access point detecting section configured to detect the access point during the period controlled by the period control section;
a switching section configured to, when the access point is detected during communication using a third-generation mobile communication system, switch the communication using the third-generation mobile communication system to communication using the wireless local area network; and
a position information acquiring section configured to acquire position information showing a current position,
wherein the period control section is configured to control the period based on the position information.

2. The wireless communication apparatus according to claim 1, wherein the period control section is further configured to make the period shorter when a position of the position information comes close by a predetermined distance to an area where the wireless local area network can be used, than when the position is not close by the predetermined distance to the area.

3. The wireless communication apparatus according to claim 1, further comprising a base station information acquiring section configured to acquire base station information comprising information for identifying cells,
wherein the period control section is further configured to control the period based on the base station information.

4. The wireless communication apparatus according to claim 3, wherein the period control section is further configured to make the period shorter when the base station information is acquired which identifies cell(s) at a predetermined distance from an area where the wireless local area network can be used, than when such base station information is not acquired.

5. The wireless communication apparatus according to claim 1, further comprising a non-contact integrated circuit card section configured to communicate with an external non-contact integrated circuit card reader apparatus,
wherein the period control section is further configured to make the period shorter when start of communication between the non-contact integrated circuit card section and the non-contact integrated circuit card reader apparatus is detected, than when the start of communication between the non-contact integrated circuit card section and the non-contact integrated circuit card reader apparatus is not detected.

6. The wireless communication apparatus according to claim 1, further comprising:
a base station information acquiring section configured to acquire base station information comprising information for identifying cells; and
an activating section configured to activate a wireless local area network circuit based on the base station information,
wherein the period control section is further configured to control the period after the wireless local area network circuit is activated by the activating section.

7. The wireless communication apparatus according to claim 6, wherein the activation section is further configured to activate the wireless local area network circuit when the base station information is acquired which identifies cell(s) at a predetermined distance from an area where the wireless local area network can be used.

8. The wireless communication apparatus according to claim 1, wherein the access point detecting section is configured to detect the access point at a beginning of the period.

9. A wireless communication apparatus comprising:
a period control section configured to control a period for detecting an access point of a wireless local area network;
an access point detecting section configured to detect the access point during the period controlled by the period control section;
a switching section configured to, when the access point is detected during communication using a third-generation mobile communication system, switch the communication using the third-generation mobile communication system to communication using the wireless local area network; and
a call start detecting section configured to detect that a call in the third-generation mobile communication system is started,
wherein the period control section is further configured to make the period shorter when the start of the call is detected, than when the start of the call is not detected.

10. The wireless communication apparatus according to claim 9, further comprising an open state detecting section configured to detect an open state of a case that is opened when communication is performed and is folded when communication is not performed,
wherein the period control section is further configured to make the period shorter when the open state is detected, than when the open state is not detected.

11. The wireless communication apparatus according to claim 9, wherein the access point detecting section is configured to detect the access point at a beginning of the period.

12. A wireless communication apparatus comprising:
a period control section configured to control a period for detecting an access point of a wireless local area network;
an access point detecting section configured to detect the access point during the period controlled by the period control section;
a switching section configured to, when the access point is detected during communication using a third-generation mobile communication system, switch the communication using the third-generation mobile communication system to communication using the wireless local area network; and a received quality measuring section configured to measure received quality of the communication using the third-generation mobile communication system, wherein the period control section is further configured to make the period shorter when the received quality is lower than a predetermined value, than when the received quality is equal to or higher than the predetermined value.

13. The wireless communication apparatus according to claim 12, further comprising a Bluetooth communication detecting section configured to detect that communication is performed by Bluetooth, wherein the period control section is further configured to make the period shorter when the Bluetooth communication detecting section detects that communication is performed by Bluetooth, than when the Bluetooth communication detecting section does not detect that communication is performed by Bluetooth.

14. The wireless communication apparatus according to claim 12, wherein the access point detecting section is configured to detect the access point at a beginning of the period.

15. A handover method comprising the steps of:
    controlling a period for detecting an access point of a wireless local area network;
    detecting the access point during the controlled period;
    when the access point is detected during communication using a third-generation mobile communication system, switching the communication using the third-generation mobile communication system to communication using the wireless local area network; and
    acquiring position information showing a current position, wherein the controlling controls the period based on the position information.

16. The handover method according to claim 15, wherein the detecting occurs at a beginning of the controlled period.

17. A handover method comprising the steps of:
    controlling a period for detecting an access point of a wireless local area network;
    detecting the access point during the controlled period;
    when the access point is detected during communication using a third-generation mobile communication system, switching the communication using the third-generation mobile communication system to communication using the wireless local area network; and
    detecting that a call in the third-generation mobile communication system is started,
    wherein, when the start of the call is detected, the controlling makes the period shorter than when the start of the call is not detected.

18. The handover method according to claim 17, wherein the detecting occurs at a beginning of the controlled period.

19. A handover method comprising the steps of:
    controlling a period for detecting an access point of a wireless local area network;
    detecting the access point during the controlled period;
    when the access point is detected during communication using a third-generation mobile communication system, switching the communication using the third-generation mobile communication system to communication using the wireless local area network; and
    measuring received quality of the communication using the third-generation mobile communication system;
    wherein, when the received quality is lower than a predetermined value, the controlling makes the period shorter than when the received quality is equal to or higher than the predetermined value.

20. The handover method according to claim 19, wherein the detecting occurs at a beginning of the controlled period.

* * * * *

UNITED STATES PATENT AND TRADEMARK OFFICE
CERTIFICATE OF CORRECTION

PATENT NO. : 8,072,937 B2
APPLICATION NO. : 12/066779
DATED : December 6, 2011
INVENTOR(S) : Yoshiyuki Hoshi et al.

It is certified that error appears in the above-identified patent and that said Letters Patent is hereby corrected as shown below:

On Title Page, Item 75:
"Yoshiyuki Hoshi, Ishikawa (JP); Mitsuru Satou, Ishikawa (JP); Tomohiro Matano, Ishikawa (JP)" should read, --Yoshiyuki Hoshi, Kanagawa (JP); Mitsuru Satou, Kanagawa (JP); Tomohiro Matano, Kanagawa (JP)--.

Signed and Sealed this
Twenty-first Day of February, 2012

David J. Kappos
*Director of the United States Patent and Trademark Office*